US010243719B2

(12) United States Patent
Bharadia et al.

(10) Patent No.: US 10,243,719 B2
(45) Date of Patent: Mar. 26, 2019

(54) SELF-INTERFERENCE CANCELLATION FOR MIMO RADIOS

(71) Applicant: The Board of Trustees of the Leland Stanford Junior University, Palo Alto, CA (US)

(72) Inventors: Dinesh Bharadia, Menlo Park, CA (US); Sachin Katti, Palo Alto, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 0 days.

(21) Appl. No.: 15/025,256

(22) PCT Filed: Sep. 29, 2014

(86) PCT No.: PCT/US2014/058117
§ 371 (c)(1),
(2) Date: Mar. 25, 2016

(87) PCT Pub. No.: WO2015/048678
PCT Pub. Date: Apr. 2, 2015

(65) Prior Publication Data
US 2016/0226653 A1    Aug. 4, 2016

Related U.S. Application Data

(60) Provisional application No. 61/883,800, filed on Sep. 27, 2013.

(51) Int. Cl.
*G01R 31/08* (2006.01)
*H04L 5/14* (2006.01)
(Continued)

(52) U.S. Cl.
CPC .......... *H04L 5/1461* (2013.01); *H04B 1/525* (2013.01); *H04B 7/0413* (2013.01);
(Continued)

(58) Field of Classification Search
CPC ............................. H04L 5/1461; H04L 5/1423
(Continued)

(56) References Cited

U.S. PATENT DOCUMENTS 3,922,617 A   11/1975 Denniston
4,952,193 A   8/1990 Talwar
(Continued)

FOREIGN PATENT DOCUMENTS

EP    0755141 A2   1/1997
EP    1959625 B1   2/2009
(Continued)

OTHER PUBLICATIONS

Adib et al., "See Through Walls with Wi-Fi!," Proceedings of the ACM SIGCOMM 2013 conference on SIGCOMM, SIGCOMM '13, pp. 75-86, ACM, New York, NY, USA, (2013).
(Continued)

*Primary Examiner* — Iqbal Zaidi
(74) *Attorney, Agent, or Firm* — Alston & Bird LLP

(57) ABSTRACT

A MIMO wireless communication device includes, in part, a first transmit path adapted to transmit a first transmit signal from a first antenna, a second transmit path adapted to transmit a second transmit signal from a second antenna, a first receive path adapted to receive a first receive signal, an interference cancellation circuit and a controller. The cancellation circuit includes a cascaded filter structure each filter including a multitude of filter taps each including a variable element. The controller dynamically varies a value applied to each of the plurality of variable elements in accordance with frequency response characteristics of the variable element to remove a portion of a self-interference and/or cross-talk interference signal present in a signal received by the device. The device measures the frequency response characteristic of a multitude of communication
(Continued)

channels, used in determining the values, via one or more preamble symbols that are jointly transmitted from the first transmit antenna and the second transmit antenna. A second portion of the interference signal is removed by a digital cancellation circuit using a multitude of samples of a transmitted signal.

23 Claims, 11 Drawing Sheets

(51) Int. Cl.
- *H04B 1/525* (2015.01)
- *H04B 7/0413* (2017.01)
- *H04B 1/48* (2006.01)
- *H04L 5/00* (2006.01)
- *H04L 5/16* (2006.01)
- *H04L 27/00* (2006.01)

(52) U.S. Cl.
CPC ...... *H04B 2001/485* (2013.01); *H04L 5/0023* (2013.01); *H04L 5/0028* (2013.01); *H04L 5/16* (2013.01); *H04L 27/0014* (2013.01); *H04L 2027/0093* (2013.01)

(58) Field of Classification Search
USPC .............................. 370/252–281; 70/277–281
See application file for complete search history.

(56) References Cited

U.S. PATENT DOCUMENTS

| | | | |
|---|---|---|---|
| 5,212,827 | A | 5/1993 | Meszko et al. |
| 5,444,864 | A | 8/1995 | Smith |
| 5,691,978 | A | 11/1997 | Kenworthy |
| 5,734,967 | A | 3/1998 | Kotzin et al. |
| 5,790,658 | A | 8/1998 | Yip et al. |
| 5,930,301 | A | 7/1999 | Chester et al. |
| 6,215,812 | B1 | 4/2001 | Young et al. |
| 6,411,250 | B1 | 6/2002 | Oswald et al. |
| 6,539,204 | B1 | 3/2003 | Marsh et al. |
| 6,567,649 | B2 | 5/2003 | Souissi |
| 6,639,551 | B2 | 10/2003 | Li et al. |
| 6,725,017 | B2 | 4/2004 | Blount et al. |
| 6,745,018 | B1 | 6/2004 | Zehavi et al. |
| 6,965,657 | B1 | 11/2005 | Rezvani et al. |
| 7,336,940 | B2 | 2/2008 | Smithson |
| 7,349,505 | B2 | 3/2008 | Blount et al. |
| 7,362,257 | B2 | 4/2008 | Bruzzone et al. |
| 7,426,242 | B2 | 9/2008 | Thesling |
| 7,564,396 | B2 | 7/2009 | Van Veldhoven et al. |
| 7,869,527 | B2 | 1/2011 | Vetter et al. |
| 8,005,235 | B2 | 8/2011 | Gupta et al. |
| 8,060,803 | B2 | 11/2011 | Kim |
| 8,086,191 | B2 | 12/2011 | Fukuda et al. |
| 8,155,595 | B2 | 4/2012 | Sahin et al. |
| 8,175,535 | B2 | 5/2012 | Mu |
| 8,179,990 | B2 | 5/2012 | Orlik et al. |
| 8,218,697 | B2 | 7/2012 | Guess et al. |
| 8,331,477 | B2 | 12/2012 | Huang et al. |
| 8,351,533 | B2 | 1/2013 | Shrivastava et al. |
| 8,385,871 | B2 | 2/2013 | Wyville |
| 8,422,540 | B1 | 4/2013 | Negus et al. |
| 8,755,756 | B1 | 6/2014 | Zhang et al. |
| 8,995,410 | B2 | 3/2015 | Balan et al. |
| 9,042,838 | B2 | 5/2015 | Braithwaite |
| 9,054,795 | B2 | 6/2015 | Choi et al. |
| 9,065,519 | B2 * | 6/2015 | Cyzs ............ H04B 1/126 |
| 9,077,421 | B1 | 7/2015 | Mehlman et al. |
| 9,124,475 | B2 | 9/2015 | Li et al. |
| 9,184,902 | B2 | 11/2015 | Khojastepour et al. |
| 2002/0064245 | A1 | 5/2002 | McCorkle |
| 2003/0031279 | A1 | 2/2003 | Blount et al. |
| 2003/0099287 | A1 | 5/2003 | Arambepola |
| 2003/0148748 | A1 | 8/2003 | Shah |
| 2004/0106381 | A1 | 6/2004 | Tiller |
| 2005/0078743 | A1 | 4/2005 | Shohara |
| 2005/0129152 | A1 | 6/2005 | Hillstrom |
| 2005/0159128 | A1 | 7/2005 | Collins et al. |
| 2005/0190870 | A1 | 9/2005 | Blount et al. |
| 2005/0254555 | A1 | 11/2005 | Teague |
| 2005/0282500 | A1 | 12/2005 | Wang et al. |
| 2006/0029124 | A1 | 2/2006 | Grant et al. |
| 2006/0030277 | A1 | 2/2006 | Cyr et al. |
| 2006/0058022 | A1 | 3/2006 | Webster et al. |
| 2006/0083297 | A1 | 4/2006 | Yan et al. |
| 2006/0209754 | A1 | 9/2006 | Ji et al. |
| 2007/0018722 | A1 | 1/2007 | Jaenecke |
| 2007/0105509 | A1 | 5/2007 | Muhammad et al. |
| 2007/0207747 | A1 | 9/2007 | Johnson et al. |
| 2007/0223617 | A1 | 9/2007 | Lee et al. |
| 2007/0249314 | A1 | 10/2007 | Sanders et al. |
| 2007/0274372 | A1 | 11/2007 | Asai et al. |
| 2008/0037801 | A1 | 2/2008 | Alves et al. |
| 2008/0089397 | A1 | 4/2008 | Vetter et al. |
| 2008/0107046 | A1 | 5/2008 | Kangasmaa et al. |
| 2008/0131133 | A1 | 6/2008 | Blunt et al. |
| 2008/0192636 | A1 | 8/2008 | Briscoe et al. |
| 2008/0219339 | A1 | 9/2008 | Chrabieh et al. |
| 2008/0219377 | A1 | 9/2008 | Nisbet |
| 2009/0022089 | A1 | 1/2009 | Rudrapatna |
| 2009/0034437 | A1 | 2/2009 | Shin et al. |
| 2009/0047914 | A1 | 2/2009 | Axness et al. |
| 2009/0115912 | A1 | 5/2009 | Liou et al. |
| 2009/0180404 | A1 | 7/2009 | Jung et al. |
| 2009/0186582 | A1 | 7/2009 | Muhammad et al. |
| 2009/0221231 | A1 | 9/2009 | Weng et al. |
| 2009/0303908 | A1 | 12/2009 | Deb et al. |
| 2010/0014600 | A1 | 1/2010 | Li et al. |
| 2010/0014614 | A1 | 1/2010 | Leach et al. |
| 2010/0022201 | A1 | 1/2010 | Vandenameele |
| 2010/0031036 | A1 | 2/2010 | Chauncey et al. |
| 2010/0056166 | A1 | 3/2010 | Tenny |
| 2010/0103900 | A1 | 4/2010 | Yeh et al. |
| 2010/0117693 | A1 | 5/2010 | Lorg et al. |
| 2010/0136900 | A1 | 6/2010 | Seki |
| 2010/0150033 | A1 | 6/2010 | Zinser et al. |
| 2010/0159837 | A1 | 6/2010 | Dent et al. |
| 2010/0159858 | A1 | 6/2010 | Dent et al. |
| 2010/0215124 | A1 | 8/2010 | Zeong et al. |
| 2010/0226416 | A1 | 9/2010 | Dent et al. |
| 2010/0226448 | A1 | 9/2010 | Dent |
| 2010/0232324 | A1 | 9/2010 | Radunovic et al. |
| 2010/0279602 | A1 | 11/2010 | Larsson et al. |
| 2010/0295716 | A1 | 11/2010 | Yamaki et al. |
| 2011/0013684 | A1 | 1/2011 | Semenov et al. |
| 2011/0026509 | A1 | 2/2011 | Tanaka |
| 2011/0149714 | A1 | 6/2011 | Rimini et al. |
| 2011/0171922 | A1 | 7/2011 | Kim et al. |
| 2011/0216813 | A1 | 9/2011 | Baldemair et al. |
| 2011/0222631 | A1 | 9/2011 | Jong |
| 2011/0243202 | A1 | 10/2011 | Lakkis |
| 2011/0256857 | A1 | 10/2011 | Chen et al. |
| 2011/0268232 | A1 | 11/2011 | Park et al. |
| 2011/0311067 | A1 | 12/2011 | Harris et al. |
| 2011/0319044 | A1 | 12/2011 | Bornazyan |
| 2012/0021153 | A1 | 1/2012 | Bhandari et al. |
| 2012/0063369 | A1 | 3/2012 | Lin et al. |
| 2012/0063373 | A1 | 3/2012 | Chincholi et al. |
| 2012/0140685 | A1 | 6/2012 | Lederer et al. |
| 2012/0147790 | A1 | 6/2012 | Khojastepour et al. |
| 2012/0154249 | A1 | 6/2012 | Khojastepour et al. |
| 2012/0155335 | A1 | 6/2012 | Khojastepour et al. |
| 2012/0155336 | A1 | 6/2012 | Khojastepour et al. |
| 2012/0201153 | A1 | 8/2012 | Bharadia et al. |
| 2012/0201173 | A1 | 8/2012 | Jain et al. |
| 2013/0005284 | A1 | 1/2013 | Dalipi |
| 2013/0044791 | A1 | 2/2013 | Rimini et al. |
| 2013/0089009 | A1 | 4/2013 | Li et al. |
| 2013/0102254 | A1 | 4/2013 | Cyzs et al. |
| 2013/0114468 | A1 | 5/2013 | Hui et al. |
| 2013/0155913 | A1 | 6/2013 | Sarca |
| 2013/0166259 | A1 | 6/2013 | Weber et al. |

(56) References Cited

U.S. PATENT DOCUMENTS

| | | | |
|---|---|---|---|
| 2013/0194984 A1 | 8/2013 | Cheng et al. | |
| 2013/0215805 A1* | 8/2013 | Hong | H04B 15/00 370/281 |
| 2013/0225101 A1 | 8/2013 | Basaran et al. | |
| 2013/0253917 A1 | 9/2013 | Schildbach | |
| 2013/0301487 A1 | 11/2013 | Khandani | |
| 2013/0301488 A1 | 11/2013 | Hong et al. | |
| 2014/0126437 A1 | 5/2014 | Patil et al. | |
| 2014/0169236 A1 | 6/2014 | Choi et al. | |
| 2014/0206300 A1 | 7/2014 | Hahn et al. | |
| 2014/0219139 A1 | 8/2014 | Choi et al. | |
| 2014/0348018 A1 | 11/2014 | Bharadia et al. | |
| 2015/0156003 A1 | 6/2015 | Khandani | |
| 2015/0156004 A1 | 6/2015 | Khandani | |
| 2016/0234005 A1 | 8/2016 | Hong et al. | |
| 2016/0266245 A1 | 9/2016 | Bharadia et al. | |
| 2017/0264420 A1* | 9/2017 | Bharadia | H04L 5/1438 |

FOREIGN PATENT DOCUMENTS

| | | |
|---|---|---|
| EP | 2237434 A1 | 10/2010 |
| EP | 2267946 A2 | 12/2010 |
| JP | 2001-196994 A | 7/2001 |
| JP | 2004-56315 A | 2/2004 |
| RU | 2256985 C2 | 7/2005 |
| WO | WO 2009/106515 A1 | 9/2009 |
| WO | WO 2012/106262 A1 | 8/2012 |
| WO | WO 2012/106263 A1 | 8/2012 |
| WO | WO 2013/185106 A1 | 12/2013 |
| WO | WO 2014/093916 A1 | 6/2014 |
| WO | WO 2014/121290 A1 | 8/2014 |
| WO | WO 2015/021481 A2 | 2/2015 |
| WO | WO 2015/048678 A1 | 4/2015 |
| WO | WO 2015/073905 A2 | 5/2015 |

OTHER PUBLICATIONS

Archer, et al., "Interface Contracts for TinyOS," IPSN '07: Proceedings of the 6th international conference on Information processing in sensor networks, pp. 158-165 (2007).

Aryafar, et al., "MIDU: Enabling MIMO Full Duplex," Proceedings of the 18th annual international conference on Mobile computing and networking, Mobicom '12, pp. 257-268, (2012).

Bahl, et al., "Reconsidering Wireless Systems With Multiple Radios," ACM SIG-COMM CCR, (2004).

Bahl, et al., "White Space Networking with Wi-Fi like Connectivity," SIGCOMM Comput. Commun. Rev., 39(4):27-38, (2009).

Bardwell, "Tech Report." [Retrieved from the Internet Dec. 3, 2016: <http://www.connect802.com/download/techpubs/2005/commercial_radios_E052315.pdf>].

Bharadia, "Full Duplex Backscatter," Proceedings of the 12th ACM Workshop on Hot Topics in Networks, 7 pages, ACM, (2013).

Bicket, "Bit-rate Selection in Wireless Networks," Master's thesis, MIT, 2005.

Bindu et al., "Active microwave imaging for breast cancer detection," Progress In Electromagnetics Research, vol. 58: 149-169, (2006).

Blefari-Melazzi, et al., "TCP Fairness Issues in IEEE 802.11 Networks: Problem Analysis and Solutions Based on Rate Control," IEEE Transactions on Wireless Communications, 6(4): 1346-1355 (2007).

Bliss, et al., "Simultaneous Transmission and Reception for Improved Wireless Network Performance," Proceedings of the 2007 IEEE Workshop on Statistical Signal Processing, (2007).

Bortz, et al., "The Simplex Gradient and Noisy Optimization Problems," North Carolina State University, Department of Mathematics, Center for Research in Scientific Computation, (1998).

Boyd, "Sequential Convex Programming." [Retrieved from the Internet Oct. 26, 2016: http://www.stanford.edu/class/ ee364b/lectures/seq_slides.pdf].

Briggs, et al., "Power Measurements of OFDM Signals," IEEE Symposium on Electromagnetic Compatibility, (2004).

Burlingame, et al., "An Analog CMOS High-Speed Continuous-Time FIR Filter," Solid-State Circuits Research Laboratory, Department of Electrical and Computer Engineering, University of California, Davis, CA, (2000).

Cavoukian, "Whole Body Imaging in Airport Scanners: Building in Privacy by Design," Information and Privacy Commissioner of Ontario, Mar. 2009. [Retrieved from the Internet Oct. 25, 2016: http://www.ipc.on.ca/wp-content/uploads/.../wholebodyimaging.pdf].

Chandra, "A Case for Adapting Channel Width in Wireless Networks," ACM SIGCOMM, (2008).

Choi, et al., "Granting Silence to Avoid Wireless Collisions," Proceedings of the 18th International Conference on Network Protocols (ICNP), (2010).

Choi, et al., "IEEE 802.11e Contention-Based Channel Access (EDCF) Performance Evaluation," IEEE ICC (2003).

Choi, et al., "The Case for a Network Protocol Isolation Layer," Sensys '09: Proceedings of the 7th ACM Conference on Embedded networked sensor systems (SenSys), pp. 267-280, (2009).

Chu, et al., "The Design and Implementation of a Declarative Sensor Network System," Proceedings of the 5th international conference on Embedded networked sensor systems, (2007).

Coffman, et al., "Channel Fragmentation in Dynamic Spectrum Access Systems—a Theoretical Study," ACM SIGMETRICS, (2010).

Culler, et al., "Towards a Sensor Network Architecture: Lowering the Waistline," Proceedings of the Tenth Workshop on Hot Topics in Operating Systems (HotOS-X), (2005).

Ding, "Digital Predistortion of Power Amplifiers for Wireless Applications," Ph.D Thesis, School of Electrical and Computer Engineering, Georgia Institute of Technology, (Mar. 2004).

Duarte et al., "Experiment-driven Characterization of Full-Duplex Wireless Systems," (2011). [Retrieved from the Internet Oct. 25, 2016: https://arxiv.org/abs/1107.1276].

Duarte, "Experiment-driven Characterization of Full-Duplex Wireless Systems," CoRR, abs/1107.1276, (2011).

Duarte, et al., "Full-Duplex Wireless Communications Using Off-The-Shelf Radios: Feasibility and First Results," Forty-Fourth Asilomar Conference on Signals, Systems, and Components, (2010).

Ekanadham, "Continuous Basis Pursuit and Its Applications," PhD thesis, New York, NY, USA, AAI3546394, (2012).

Erceg et al., "TGn channel models," Tech. Rep. IEEE P802.11, Wireless LANs, Garden Grove, Calif, USA, (2004)

Ettus Research, UHD Daughterboard Application Notes. [Retrieved from the Internet Dec. 8, 2016: <http://files.ettus.com/uhd_docs/manual/html/dboards.html>].

Ettus Research, Universal Software Radio Peripheral (USRP). [Retrieved from the Internet Dec. 3, 2016: <http://www.ettus.com>].

Everett, et al., "Empowering Full-Duplex Wireless Communication by Exploiting Directional Diversity," 2011 Conference Record of the Forty Fifth Asilomar Conference on Signals, Systems and Computers, pp. 2002-2006, (Nov. 2011).

Everett, et al., "Passive Self-Interference Suppression for Full-Duplex Infrastructure Nodes," CoRR, abs/1302.2185, (2013).

FCC, Table of Frequency Allocations. [Retrieved from the Internet Dec. 3, 2016: <http://transition.fcc.gov/oet/spectrum/table/fcctable.pdf>].

FDA, "Medical Imaging," [Retrieved from the Internet Oct. 25, 2016: http://www.fda.gov/Radiation-EmittingProducts/RadiationEmittingProductsandProcedures/MedicalImaging/MedicalX-Rays/ucm115317.htm].

Fear et al., "Confocal Microwave Imaging for Breast Cancer Detection: Localization of Tumors in Three Dimensions," IEEE Transactions on Biomedical Engineering, 49(8):812-822, (2002).

Fear et al., "Microwave Detection of Breast Cancer," IEEE Transactions on Microwave Theory and Techniques, 48(11):1854-1863, (2000).

Fear, et al., "Enhancing breast tumor detection with near-field imaging," Microwave Magazine, IEEE, 3(1):48-56, (2002).

Fleury et al., "Channel Parameter Estimation in Mobile Radio Environments Using the SAGE Algorithm," IEEE Journal on Selected Areas in Communications, 17(3):434-450, (1999).

(56) References Cited

OTHER PUBLICATIONS

Gember, et al., "A Comparative Study of Handheld and Non-Handheld Traffic in Campus Wi-Fi Networks," Passive and Active Measurement Conf., (2011).
Gheorma, et al., "Rf Photonic Techniques for Same Frequency Simultaneous Duplex Antenna Operation," IEEE Photonics Technology Letters, 19(13): 1014-1016, (2007).
Gill, Slide Presentation: "RF performance of mobile terminals—a challenge for the industry," Cambridge Wireless Radio Technology Special Interest Group (SIG), (2011).
Gizmodo, "IPhone 4 Antenna-Gate," (2011). [Retrieved from the Internet Dec. 3, 2016: <http://gizmodo.com/5846638/giz-explains-whats-so-smart-about-the-iphone-4ss-antenna>].
Gnawali, et al., "Collection Tree Protocol," Proceedings of the 7th ACM Conference on Embedded Networked Sensor Systems (SenSys), pp. 1-14 (2009).
Goldsmith, "Wireless Communications," Cambridge University Press, (2004).
Gollakota, et al., "They Can Hear Your Heartbeats: Non-Invasive Security for Implantable Medical Devices," SIGCOMM Comput. Commun. Rev., 41(4), (Aug. 2011).
Gollakota, et al., "ZigZag Decoding: Combating Hidden Terminals in Wireless Networks," SIGCOMM '08: Proceedings of the ACM SIGCOMM 2008 Conference on Data Communication, pp. 159-170, (2008).
Gummadi, et al., "Understanding and Mitigating the Impact of RF Interference on 802.11 Networks," Proceedings of the 2007 conference on Applications, technologies, architectures, and protocols for computer communications (SIGCOMM), (2007).
Guo et al., "Microwave Imaging via Adaptive Beamforming Methods for Breast Cancer Detection," Progress in Electromagnetics Research, vol. 1, 350-353, (2005).
Halperin, et al., "Taking the Sting out of Carrier Sense: Interference Cancellation for Wireless LANs." MobiCom '08: Proceedings of the 14th ACM international conference on Mobile computing and networking, pp. 339-350, (2008).
Harashima, "Matched-Transmission Technique for Channels With Intersymbol Interference," IEEE Transactions on Communications, COM-20:774-780, (1972).
Hong et al., "Picasso: Flexible RF and Spectrum Slicing," In Proceedings of the ACM SIGCOMM 2012 conference on Applications, technologies, architectures, and protocols for computer communication, SIGCOMM '12, pp. 283-284, ACM, Helsinki, Finland, (2012).
Hong, et al, "DOF: A Local Wireless Information Plane," ACM SIGCOMM, (2011).
Hua, et al., "A method for Broadband Full-Duplex Mimo Radio," IEEE Signal Processing Letters, 19(12):793-796, (Dec. 2012).
Huang, "Optimal Transmission Strategies for Dynamic Spectrum Access in Cognitive Radio Networks," IEEE Transactions on Mobile Computing, 8(12): 1636-1648, (2009).
Huyer, et al., "SNOBFIT—Stable Noisy Optimization by Branch and Fit," ACM Trans. Math. Softw., 35:9:1-9:25, (Jul. 2008).
Intersil Corp, "Qhx220 Active Isolation Enhancer and Interference Canceller." [Retrieved from the Internet Dec. 6, 2016: <http://www.intersil.com/content/dam/Intersil/documents/qhx2/qhx220.pdf>].
Italian National Research Council, "Dielectric Properties of Body Tissues." [Retrieved from the Internet Oct. 25, 2016: http://niremf.ifac.cnr.it/tissprop/].
Iyer, et al., "Specnet: Spectrum Sensing Sans Frontiers," USENIX NSDI, (2011).
Jain et al., "Practical, Real-time, Full Duplex Wireless," MobiCom '11, pp. 301-312, ACM, New York, NY, USA, (2011).
Jamieson, et al., "PPR: Partial Packet Recovery for Wireless Networks," Proceedings of the 2007 conference on Applications, technologies, architectures, and protocols for computer communications (SIGCOMM), (2007).
Jiang, et al., "An Architecture for Energy Management in Wireless Sensor Networks," Proceedings of the International Workshop on Wireless Sensornet Architecture (WWSNA), (2007).
Jung, et al., "A Reconfigurable Carrier Leakage Canceler for UHF RFID Reader Front-Ends," IEEE Transactions on Circuits and Systems I: Regular Papers, 58(1):70-76, (Jan. 2011).
Khojastepour, et al., "The Case for Antenna Cancellation for Scalable Full Duplex Wireless Communications," ACM HOTNETS, (2011).
Kim, et al., "Co-Channel Interference Cancellation Using Single Radio Frequency and Baseband Chain," IEEE Transactions on Communications, 58(7):2169-2175, (2010).
Kim, et al., "Flush: A Reliable Bulk Transport Protocol for Multihop Wireless Networks," In Proceedings of the Fifth ACM Conference on Embedded networked sensor systems (SenSys), (2007).
Klues, et al., "Integrating Concurrency Control and Energy Management in Device Drivers," Proceedings of twenty-first ACM SIGOPS symposium on Operating systems principles (SOSP), (2007).
Knox, "Single Antenna Full Duplex Communications using a Common Carrier," 2012 IEEE 13th Annual Wireless and Microwave Technology Conference (WAMICON), pp. 1-6, (2012).
Lakshminarayanan, et al., "Rfdump; An Architecture for Monitoring the Wireless Ether," ACM CoNEXT, (2009).
Lamprecht, et al., "Passive Alignment of Optical Elements in a Printed Circuit Board," Electric Components and Technology Conference, (2006).
Lee, et al., "Improving Wireless Simulation Through Noise Modeling," Proceedings of the 6th international conference on Information processing in sensor networks (IPSN), pp. 21-30, (2007).
Leith, et al., "TCP Fairness in 802.11e WLANs," IEEE Communications Letters, 9(12), (2005).
Levis, et al., "T2: A Second Generation OS for Embedded Sensor Networks," Technical Report TKN-05-007, Telecommunication Networks Group, Technische Universitat Berlin, (2005).
Liang, et al., "Sensing-Throughput Tradeoff for Cognitive Radio Networks," IEEE Transactions on Wireless Communications, 7(4): 1326-1337, (2008).
Liang, et al., "Surviving Wi-Fi Interference in Low Power Zigbee Networks," Proceedings of the Eighth ACM Conference on Embedded Networked Sensor Systems (SenSys), (2010).
Lin, et al., "Data Discovery and Dissemination with DIP," Proceedings of the 7th international conference on Information processing in sensor networks (IPSN), pp. 433-444, (2008).
Matheus, "Optimal Design of a Multicarrier Systems with Soft Impulse Shaping Including Equalization in Time or Frequency Direction," Global Telecommunications Conference, 1997, GLOBECOM '97, IEEE, vol. 1, pp. 310-314, (Nov. 1997).
Maxim Integrated, Power Amplifier Data-sheet. [Retrieved from the Internet Dec. 6, 2016: <http://datasheets.maximintegrated.com/en/ds/MAX2828-MAX2829.pdf>].
Mini-Circuits, Power Amplifier Data-sheet. [Retrieved from the Internet Dec. 6, 2016: <http://www.minicircuits.com/pdfs/PGA-105+.pdf>].
Mini-Circuits, Power Amplifier Data-sheet. [Retrieved from the Internet Dec. 6, 2016: <http://www.minicircuits.com/pdfs/ZHL-30W-262+.pdf>].
Morgan, et al, "A Generalized Memory Polynomial Model for Digital Predistortion of RF Power Amplifiers," IEEE Transactions on Signal Processing, 54(10):3852-3860, (2006).
National Instruments, N1 5781 Datasheet, (2011). [Retrieved from the Internet Dec. 6, 2016: <http://sine.ni.com/ds/app/doc/p/id/ds-212/lang/en>].
National Instruments, NI PXIe-8133 User Manual, (Jul. 2012). [Retrieved from the Internet Dec. 13, 2016: <www.ni.com/pdf/manuals/372870d.pdf>].
National Instruments, White Paper: "Understanding Dynamic Hardware Specifications," (Mar. 2010).
Palazzi, et al., "A RIO-Like Technique for Interactivity Loss-Avoidance in Fast-Paced Multiplayer Online Games," ACM Computers in Entertainment, (2005).
Peregrine Semiconductor, PE 47303 Data-sheet. [Retrieved from the Internet Dec. 6, 2016: <http://www.psemi.com/pdf/datasheets/pe43703ds.pdf>].

(56) References Cited

OTHER PUBLICATIONS

Polastre, et al., "A Unifying Link Abstraction for Wireless Sensor Networks," SenSys '05: Proceedings of the 3rd international conference on Embedded networked sensor systems, pp. 76-89, (2005).
Poston, et al., "Discontiguous OFDM Considerations for Dynamic Spectrum Access in Idle TV Channels," IEEE DySPAN, (2005).
Radunović, et al., "Efficiency and Fairness in Distributed Wireless Networks Through Self-Interference Cancellation and Scheduling," Technical Report MSR-TR-2009-27, Microsoft Research, (2009).
Radunović, et al., "Rethinking Indoor Wireless Mesh Design: Low Power, Low Frequency, Full-duplex," Fifth IEEE Workshop on Wireless Mesh Networks (WiMesh), pp. 1-6, (2010).
Rahul, et al., "Learning to Share: Narrowband-Friendly Wideband Networks," ACM SIGCOMM, (2008).
Rice University, WARP Project. [Retrieved from the Internet Dec. 8, 2016: <http://warp.rice.edu>].
Rohde & Schwarz, "Rohde & Schwarz FSW Signal and Spectrum Analyzer User Manual," (2016). [Retrieved from the Internet Dec. 10, 2016: <https://cdn.rohde-schwarz.com/pws/dl_downloads/dl_common_library/dl_manuals/gb_1/f/fsw_1/FSW_UserManual_en_26.pdf>].
Rohde & Schwarz, "Rohde & Schwarz SMBV 100A Signal Generator User Manual," (2016). [Retrieved from the Internet Dec. 6, 2016: <https://cdn.rohde-schwarz.com/pws/dl_downloads/dl_common_library/dl_manuals/gb_1/s/smbv/SMBV100A_OperatingManual_en_16.pdf>].
Sahai et al., "On the Impact of Phase Noise on Active Cancellation in Wireless Full-Duplex," (2012). [Retrieved from the Internet Oct. 25, 2016: https://arxiv.org/pdf/1212.5462].
Sahai, et al., "Spectrum Sensing: Funamental limits," draft chapter for a Springer Book: Cognitive Radios: System Design Perspective, (Jun. 2009).
Sen, et al., "AccuRate: Constellation Based Rate Estimation in Wireless Networks," Proceedings of the Seventh USENIX Symposium on Networked Systems Design and Implementation (NSDI), (2010).
Sen, et al., "CSMA/CN: Carrier Sense Multiple Access with Collision Notification," Proceedings of the 16th annual international conference on Mobile computing and networking (MobiCom), pp. 25-36, (2010).
Shen, et al., "Channel Estimation in OFDM Systems," Application Note, Freescale Semiconductor, (2006).
Srinivasan, et al., "An Empirical Study of Low-Power Wireless," ACM Transactions on Sensor Networks, 6(2):1-49, (2010).
Srinivasan, et al., "RSSI is Under Aprciated," Proceedings of the Third Workshop on Embedded Networked Sensors (EmNets), (2006).
Srinivasan, et al., "Some Implications of Low Power Wireless to IP Networking," Proceedings of the Fifth Workshop on Hot Topics in Networks (HotNets-V), (Nov. 2006).
Srinivasan, et al., "The κ-Factor: Inferring Protocol Performance Using Inter-Link Reception Correlation," Proceedings of the 16th annual international conference on Mobile computing and networking (MobiCom), (2010).
Srinivasan, et al., The β-factor: Measuring Wireless Link Burstiness, Proceedings of the Sixth ACM Conference on Embedded Networked Sensor Systems, (Nov. 2008).
Sundstrom et al., "Power Dissipation Bounds for High-Speed Nyquist Analog-to-Digital Converters." IEEE Transactions on Circuits and Systems I: Regular Papers, 56(3):509-518, (2009).
Surowiec et al., "Dielectric Properties of Breast Carcinoma and the Surrounding Tissues," IEEE Transactions on Biomedical Engineering, 35(4):257-263, (1988).
Tan, et al., "Fine Grained Channel Access in Wireless LAN," ACM SIGCOMM, (2010).
Tan, et al., "Spectrum Virtualization Layer," MSR Tech Report, (2011). [Retrieved from the Internet Dec. 8, 2016: <http://research.microsoft.com/apps/pubs/default.aspx?id=154410>].
Tavakoli, et al., "A Declarative Sensornet Architecture," Proceedings of the International Workshop on Wireless Sensornet Architecture (WWSNA), (2007).
Tibshirani, "Regression shrinkage and selection via the lasso," Journal of the Royal Statistical Society, Series B (Methodological), pp. 267-288 (1996).
Tomlinson, "New Automatic Equaliser Employing Modulo Arithmetic," Electronic Letters, 7(5/6):138-139, (1971).
Tourrilhes, "Fragment Adaptive Reduction: Coping with Various interferers in radio unlicensed bands," IEEE IC, (2001).
Tse et al., "Fundamentals of Wireless Communications," Aug. 13, 2004. [Retrieved from the Internet Oct. 25, 2016: www.eecs.berkeley.edu/~dtse/main.pdf].
Vutukuru, et al., "Cross-Layer Wireless Bit Rate Adaption," SIGCOMM Comput. Commun. Rev., 39(4):3-14, (2009).
Weingarten, et al., "The Capacity Region of the Gaussian Multiple-Input Multiple-Output Broadcast Channel," IEEE Transactions on Information Theory, 52(9):3936-3964, (2006).
Wi-Fi Alliance, WiFi Direct Industry White Paper, (2010). [Retrieved from the Internet Dec. 13, 2016: <http://www.wi-fi.org/discover-wi-fi/wi-fi-direct>].
Wikipedia, "Star Trek Tricoder," [Retrieved from the Internet Oct. 26, 2016: http://en.wikipedia.org/wiki/Tricorder].
Winter, et al., "RPL: IPv6 Routing Protocol for Low power and Lossy Networks," IETF Internet draft (Work in Progress), (Jul. 2010). [Retrieved from the Internet Dec. 8, 2016: <https://tools.ietf.org/id/draft-ietf-roll-rpl-11.txt>].
Wischik, et al., "Design, implementation and evaluation of congestion control for multipath TCP," USENIX NSDI, (2011).
Xilinx, DS249: LogiCore IP CORDIC v4.0 Data Sheet, (Mar. 1, 2011). [Retrieved from the Internet Dec. 3, 2016: <http://www.xilinx.com/support/documentation/ip_documentation/cordic_ds249.pdf>].
Xilinx, UG193: XtremeDSP User Guide, (Jan. 26, 2012). [Retrieved from the Internet Dec. 6, 2016: <https://www.xilinx.com/support/documentation/user_guides/ug193.pdf>].
Xiong et al., "ArrayTrack: A Fine-Grained Indoor Location System" In Proceedings of the 10th USENIX conference on Networked Systems Design and Implementation, nsdi'13, pp. 71-84, USENIX Association, Berkeley, CA, USA, (2013).
Yang, et al., "Supporting Demanding Wireless Applications with Frequency-agile Radios," USENIX NSDI, (2010).
Yang, et al., "The Spaces Between Us: Sensing and Maintaining Boundaries in Wireless Spectrum Access," ACM MOBICOM, (2010).
Yoo, et al., "On the Optimality of Multiantenna Broadcast Scheduling Using Zero-Forcing Beamforming," IEEE Journal on Selected Areas in Communications, 24(3):528-541, (2006).
Yuan, et al., "KNOWS: Kognitiv Networking Over White Spaces," IEEE DySPAN, (2007).
Zhang et al., "A novel method for microwave breast cancer detection," Progress in Electromagnetics Research, vol. 83: 413-434, (2008).
Zhang, et al., "Gain/Phase Imalance-Minimization Techniques for LINC Transmitters," IEEE Transactions on Microwave Theory and Techniques, 49(12):2507-2516, (2001).
U.S. Appl. No. 13/293,069, Final Office Action dated May 2, 2017.
U.S. Appl. No. 13/293,069, Non-Final Office Action dated Jan. 6, 2017.
U.S. Appl. No. 13/293,072, Non-Final Office Action dated Jan. 13, 2017.
Bharadia et al., "Full Duplex Radios" SIGOMM, Aug. 12-16, 2013, Hong Kong, China, Copyright 2013 ACM 978-1-4503-2056-6/6/13/08, 12 pages.
Chinese Application No. 201380041721.0, First Office Action dated Nov. 18, 2015.
EPO Application No. 20130801200, Supplementary European Search Report dated Feb. 4, 2016.
PCT International Preliminary Report on Patentablility for application PCT/US2012/023183 dated Aug. 6, 2013.
PCT International Preliminary Report on Patentablility for application PCT/US2012/023184 dated Aug. 6, 2013.
PCT International Preliminary Report on Patentablility for application PCT/US2013/044830 dated Dec. 9, 2014.
PCT International Preliminary Report on Patentability for application PCT/US2013/075166 dated Jun. 16, 2015.

(56) References Cited

OTHER PUBLICATIONS

PCT International Preliminary Report on Patentability for application PCT/US2014/014726 dated Aug. 4, 2015.
PCT International Preliminary Report on Patentablility for application PCT/US2014/050584 dated Feb. 9, 2016.
PCT International Preliminary Report on Patentablility for application PCT/US2014/058117 dated Mar. 29, 2016.
PCT International Preliminary Report on Patentablility for application PCT/US2014/065814 dated May 17, 2016.
PCT International Search Report and Written Opinion of the International Searching Authority for application PCT/US2012/023183 dated May 17, 2012.
PCT International Search Report and Written Opinion of the International Searching Authority for application PCT/US2012/023184 dated May 7, 2012.
PCT International Search Report and Written Opinion of the International Searching Authority for application PCT/US2013/075166 dated Apr. 22, 2014.
PCT International Search Report and Written Opinion of the International Searching Authority for application PCT/US2014/014726 dated Jun. 2, 2014.
PCT International Search Report and Written Opinion of the International Searching Authority for application PCT/US2014/050584 dated Jan. 21, 2015.
PCT International Search Report and Written Opinion of the International Searching Authority for application PCT/US2014/058117 dated Dec. 30, 2014.
PCT International Search Report and Written Opinion of the International Searching Authority for application PCT/US2014/065814 dated Feb. 19, 2015.
PCT International Search Report for application PCT/US2013/044830 dated Sep. 26, 2013.
PCT Written Opinion of the International Searching Authority for application PCT/US2013/044830 dated Sep. 26, 2013.
U.S. Appl. No. 13/293,069, Final Office Action dated Jun. 8, 2016.
U.S. Appl. No. 13/293,069, Final Office Action dated Oct. 21, 2014.
U.S. Appl. No. 13/293,069, Non-Final Office Action dated May 1, 2014.
U.S. Appl. No. 13/293,069, Non-Final Office Action dated Jul. 17, 2013.
U.S. Appl. No. 13/293,069, Non-Final Office Action dated Sep. 21, 2015.
U.S. Appl. No. 13/293,072, Final Office Action dated Mar. 31, 2014.
U.S. Appl. No. 13/293,072, Final Office Action dated Mar. 15, 2016.
U.S. Appl. No. 13/293,072, Non-Final Office Action dated Jul. 17, 2015.
U.S. Appl. No. 13/293,072, Non-Final Office Action dated Jul. 19, 2013.
U.S. Appl. No. 13/762,043, Final Office Action dated Jun. 8, 2015.
U.S. Appl. No. 13/762,043, Non-Final Office Action dated Nov. 17, 2014.
U.S. Appl. No. 13/762,043, Notice of Allowance dated Nov. 9, 2015.
U.S. Appl. No. 13/913,323, Final Office Action dated Apr. 21, 2015.
U.S. Appl. No. 13/913,323, Non-Final Office Action dated Mar. 12, 2015.
U.S. Appl. No. 13/913,323, Notice of Allowance dated Feb. 12, 2016.
U.S. Appl. No. 13/913,323, Notice of Allowance dated Oct. 16, 2015.
U.S. Appl. No. 13/913,323, Notice of Allowance dated Nov. 5, 2015.
U.S. Appl. No. 13/913,323, Notice of Allowance dated Nov. 13, 2015.
U.S. Appl. No. 14/456,807, Non-Final Office Action dated Mar. 4, 2016.
U.S. Appl. No. 13/293,069, Advisory Action dated Aug. 29, 2017.
U.S. Appl. No. 13/293,069, Notice of Allowance dated Sep. 27, 2017.
U.S. Appl. No. 13/293,069, Notice of Allowance dated Oct. 6, 2017.
U.S. Appl. No. 13/293,072, Applicant Initiated Interview Summary dated Aug. 7, 2018.
U.S. Appl. No. 13/293,072, Final Office Action dated Apr. 5, 2018.
U.S. Appl. No. 13/293,072, Final Office Action dated Aug. 3, 2017.
U.S. Appl. No. 14/456,807, Non-Final Office Action dated Oct. 25, 2017.
U.S. Appl. No. 14/456,807, Notice of Allowance dated Jun. 6, 2018.
U.S. Appl. No. 15/133,175, Final Office Action dated May 10, 2018.
U.S. Appl. No. 15/133,175, Non-Final Office Action dated Sep. 21, 2017.
U.S. Appl. No. 13/293,072, Notice of Allowance dated Oct. 17, 2018.
U.S. Appl. No. 14/456,807, Non-Final Office Action dated Sep. 21, 2018.
U.S. Appl. No. 15/133,175, Notice of Allowance dated Nov. 28, 2018.
U.S. Appl. No. 13/293,072, Notice of Allowance dated Dec. 27, 2018.

* cited by examiner

SELF-INTERFERENCE CANCELLATION FOR MIMO RADIOS

CROSS-REFERENCES TO RELATED APPLICATIONS

The present Application is a United States national phase application of co-pending International Application No. PCT/US14/58117, filed on Sep. 29, 2014 and entitled "SELF-INTERFERENCE CANCELLATION FOR MIMO RADIOS", which Application claims the benefit of priority to U.S. Provisional Application No. 61/883,800, filed on Sep. 27, 2013 and entitled "FULL DUPLEX MIMO RADIOS", the contents of which are incorporated herein by reference in their entirety.

The present application incorporates herein by reference in their entirety the contents of commonly assigned following U.S. Applications:

application Ser. No. 13/293,069, filed Nov. 9, 2011, entitled "single Channel Full-Duplex Wireless Communication;"

application Ser. No. 13/293,072, filed Nov. 9, 2011, entitled "Adaptive Techniques For Full Duplex Communications;" and application Ser. No. 13/913,323, filed Jun. 7, 2013, entitled "Systems and Methods for Cancelling Interference using Multiple Attenuation Delays;" and application Ser. No. 14/456,807, filed Aug. 11, 2014, entitled "Self-interference Cancellation."

The present application incorporates herein by reference in its entirety article entitled "Full Duplex MIMO Radios," by Dinesh Bharadia, Sachin Katti, NSDI-14.

TECHNICAL FIELD

The present invention relates to wireless communication systems, and more particularly to cancellation of interference in full-duplex wireless communication systems.

BACKGROUND OF THE INVENTION

Conventional wireless communications systems operate in a half-duplex mode by transmitting and receiving signals via different frequency channels. Transmitting and receiving signals via the same frequency channel, commonly referred to as full duplex, reduces the frequency spectrum used for transmission. However, conventional full-duplex communication systems suffer from interference (e.g., self-interference and/or cross-talk interference) thereby overwhelming the system's receiver and preventing it from operating properly. For example if a WiFi radio transmits at 20 dBm (100 mW), and the noise floor of the radio is −90 dBm (e.g., 105 dB lower than the transmit signal power), interference has to be canceled by at least 110 dB to render it negligible. A need continues to exist for a full-duplex wireless communications system that cancels or minimizes the interference signal to a negligible amount and in a relatively short time period.

BRIEF SUMMARY OF THE INVENTION

A wireless communication system, in accordance with one embodiment of the present invention includes, in part, a first transmit path adapted to transmit a first transmit signal from a first antenna, a second transmit path adapted to transmit a second transmit signal from a second antenna, a first receive path adapted to receive a first receive signal, and a first interference cancellation circuit coupled to the first and the second transmit paths. The first cancellation circuit is adapted to remove a first portion of an interference signal from the first receive signal corresponding to the first transmit signal and a second portion of the interference signal from the first receive signal corresponding to the second transmit signal. The first analog cancellation circuit includes, in part, a multitude of filter taps each including a variable element. The wireless communication system further includes a controller adapted to dynamically vary a value applied to each of the plurality of variable elements in accordance with frequency response characteristics of the variable element.

A method of operating a wireless communication system, in accordance with one embodiment of the present invention includes, in part, transmitting a first transmit signal from a first transmit path using a first antenna, transmitting a second transmit signal from a second transmit path using a second antenna, and receiving a first receive signal at a first receive path using the first antenna. The first receive signal includes a self-interference component corresponding to the first transmit signal, and a cross-talk interference component corresponding to the second transmit signal. The method further includes dynamically varying a value applied to each of a plurality of variable elements disposed in the wireless communication system in accordance with a frequency response characteristics of the variable elements thereby to remove, from the first receive signal, the self-interference component and the cross-talk interference component.

DETAILED DESCRIPTION OF THE INVENTION

Figure 1:
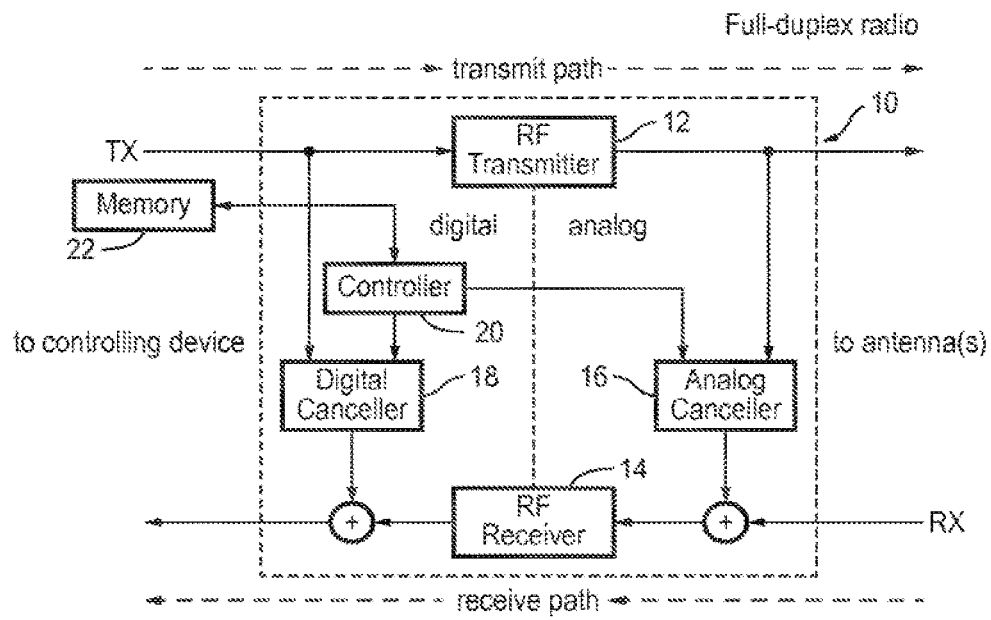
FIG. 1 is an exemplary block diagram of a full-duplex wireless communication system, in accordance with one embodiment of the present invention.

The word "exemplary" is used herein to mean "serving as an example, instance, or illustration." Any embodiment or design described herein as "exemplary" is not necessarily to be construed as preferred or advantageous over other embodiments or designs.

Embodiment of the present invention relate to processing signals and, in particular, to a full-duplex signal shaping system. The system may include one or more antennas for transmitting and/or receiving signals over a plurality of wireless spectrum fragments and a signal processing layer in communication with the one or more antennas for simultaneously causing reception of the received signal and transmission of the transmitted signal. The signal processing layer may include interference cancellation components for eliminating a portion of interference from the received signal. In some cases, the interference (e.g., self-interference and/or cross-talk interference) can be caused by the transmitted signal and affect the received signal. "Self-interference" is used herein to refer to the interference experienced by a signal received at an antenna that is caused by transmissions form the same antenna. "Cross-talk interference" or "cross talk" is used herein to refer to the interference caused by transmissions from an antenna on the signals received by other antennas in a system that has two or more antennas.

The signal processing layer may also include filtering components for removing interference from the received signal. Through use of these components, the full-duplex signal shaping system enables a full-duplex radio to simultaneously transmit and receive signals despite interference issues (e.g., self-interference and/or cross-talk interference), by reducing the amount of interference present in received signals.

In conventional communications systems, simultaneous transmission and reception (even over different bands) cannot typically be achieved without some form of ancillary processing, because the transmitted signal may be substantially stronger than the received signal. For example, when an analog-to-digital converter (ADC) of a full-duplex radio samples an analog receive signal, the ADC converts each sample into a number corresponding to a voltage level. The value of each sampled point can be represented by a fixed length variable, which can have a size determined by the resolution, or dynamic range, of the ADC. If for example, the ADC has a resolution of n bits (e.g., n=12), then the ADC can only hold values from 0 to $2^{(n-1)}$. Because the self-interference can be billions of times stronger than the received signal, the dynamic range of an ADC may not be large enough to acquire the received signal in the face of such large self-interference; the receiver can become saturated and the received signal may be effectively "lost" in quantization. Indeed, in the example case of WiFi™, the self-interference power can be over 60-70 dB greater than the received signal. This saturation can occur even when the transmit signal and receive signal are on different spectrum fragments.

The full-duplex signal shaping system may enable full-duplex communication over arbitrary spectrum fragments, so that simultaneous transmission and reception may occur over different frequency channels (which can be arbitrary; e.g., not specified in advance and varying in time). In some implementations, the full-duplex signal shaping system may utilize a combination of mechanisms (e.g., analog circuitry and digital processing systems) to achieve full-duplex communication over a plurality of spectrum fragments. To prevent receiver saturation, the full-duplex signal shaping system preferably cancels self-interference and/or cross-talk interference from received signals. In other words, the self-interference and/or cross-talk interference signals can be subtracted from the received signal to reduce the risk of receiver saturation.

In some implementations, analog circuitry components of the full-duplex signal shaping system reduce self-interference of received signals enough that receiver saturation does not occur. The analog circuitry components may provide analog cancellation based on the use of passive components, the use of balanced-unbalanced transformers (baluns), and/or the use of any other analog circuitry components (e.g., passive/active filters, op-amps, etc.).

The analog circuitry components of the full-duplex signal shaping system preferably include programmable passive attenuators and passive delay lines; additionally, or alternatively, the analog circuitry components may include any suitable analog signal shaping components/systems, including scaling systems (e.g., attenuators, amplifiers, phase inverters), phase-shifting systems, and/or delay systems (e.g., passive delay lines, active delay lines, etc.). In one implementation, the full-duplex signal shaping system includes a passive programmable attenuator and a simple wire whose length is statically matched roughly to the over-the-air delay for the transmitted signal.

The full-duplex signal shaping system may invert a self-interference cancellation signal (for addition to a receive signal) using a balun; additionally or alternatively, the analog circuitry components may include a subtractor circuit. For example, a balun in a typical operational configuration takes an input signal on the unbalanced tap and produces two output signals that are inverses of each other on the balanced taps. The same operation can be modeled in reverse as taking two inputs on the balanced side and producing the subtraction of the input signals as the signal on the unbalanced side. Hence, if the two inputs of the balun are exact replicas of each other, the output of the balun will be substantially zero.

Self-interference cancellation can thus prevent full-duplex radio receivers from saturating, but by itself self-interference cancellation may not be sufficient to fully cancel out the interference between bands. However, because analog self-interference cancellation preferably reduces self-interference enough to avoid receiver saturation, digital signal shaping systems may preferably be used by the full-duplex signal shaping system to remove a portion or all of remaining self-interference in the receive signal. Digital signal shaping systems of the full-duplex signal shaping system preferably include a set of programmable digital filters (also referred to as a filter engine) to digitally remove self-interference from the receive signal, but may additionally or alternatively include any suitable digital signal shaping systems. The filter engine can be configured to ensure that the transmitted or received signals are shaped according to, for example, a higher-layer specification defining which spectrum fragments to use for transmission/reception. At the receiver, this can include converting the sampled wideband signal into narrowband streams by down converting and filtering to remove adjacent band interference. The reverse functionality may be used at the transmitter; narrowband baseband streams may be up converted and filtered to prevent aliasing.

The full-duplex signal shaping system preferably includes both an analog self-interference cancellation system and a digital signal shaping system, but may additionally or alternatively include only one of these systems.

In some implementations, the full-duplex signal shaping system may allow simultaneous transmission and reception on separate arbitrary channels that are not specified in advance. The full-duplex signal shaping system may be used in a wide range of radios (e.g., mobile cellular devices, IEEE 802.22 white space devices, IEEE 802.15.4 sensor network nodes) and enable them to operate on different channels of varying bandwidths at different times.

In some implementations, full-duplex signal shaping systems may be used in centralized access points (e.g., cellular base stations or WiFi™ access points) to provide full-duplex signal shaping, enabling the access points to utilize varying amounts of spectrum to support different user numbers. Because the ability to simultaneously transmit and receive across different fragments decouples the use of each fragment from its frequency band, different users may be able to run different applications with varying latency requirements and not substantially affect one another.

In some implementations, the full-duplex signal shaping system can enhance the use of routing protocols (e.g., in wireless mesh networks). Full-duplex operation can reduce latency and the overhead associated with synchronizing all of the nodes to ensure that nodes do not attempt to transmit when they should be receiving a packet. Routing benefits created by full-duplex signal shaping can also be used to aggregate backhaul capacity (e.g., if one backhaul link is overloaded, the node could act as a router and offload the data it cannot support onto a node which has excess backhaul capacity).

Full-duplex signal shaping may additionally be used in the context of peer-to-peer networks (e.g., WiFi Direct®). Full-duplex signal shaping may enable one node to transmit to another node while receiving from that node (or a third node). Full-duplex signal shaping may enable different peer-to-peer connections to operate independently and reduce the overhead associated with sending out beacons to announce availability to receive. Full-duplex signal shaping may also obviate the need for synchronized transmission and/or reception scheduling.

In some implementations, the full-duplex signal shaping system may provide self-interference cancellation to enable simultaneous transmission and reception on different bands. For example, the full-duplex signal shaping system may include an analog self-interference cancellation coupled to a single antenna utilizing a circulator (or isolator, duplexer, etc.) to separate out the transmit and receive signals. It can also involve more than two antennas (e.g., 3 antennas, such as two transmit antennas and one receive, where the two transmit antennas can be placed half of a wavelength apart from one another). In another embodiment, the full-duplex signal shaping system may involve M transmit antennas and N receive antennas (N and M being integer numbers). The full-duplex signal shaping system may additionally or alternatively include a digital cancellation system implementing filters; e.g., Butterworth, Chebyshev, FIR, IIR, etc.

Many everyday devices, e.g., mobile phones, wireless local area networks ("LANs"), Bluetooth® enabled devices, ZigBee® small low-power digital radios, global positioning systems ("GPS"), two-way radios such as Land Mobile, FRS and GMRS radios, operate in a ultra-high frequency (UHF) communication spectrum of 300-3000 MHz. Given the types of devices that operate in this band, this spectrum can become increasingly fragmented. The most common operational frequency for these devices is approximately 2.4 GHz, where these devices operate in an Industrial, Scientific, and Medical ("ISM") radio band. In the unlicensed ISM band, each device may operate in its own contiguous narrow band of varying widths. This can lead to fragmentation of the 2.4 GHz ISM band into various chunks (e.g., 100 MHz chunks). Spectrum fragmentation can vary over time and space, as the set of available ISM bands can depend on which devices are operating at a particular location at any given time.

FIG. 1 is a block diagram of an exemplary full-duplex radio 10, in accordance with one embodiment of the present invention. Full-duplex radio 10 is shown as including, in part, an RF transmitter 12, an RE receiver 14, an analog self-interference cancellation block 14, and a digital self-interference cancellation block 18. Full-duplex radio is also shown as including a controller 20 for controlling operations of analog self-interference cancellation block 14 and digital self-interference cancellation block 18, and for accessing and executing program code stored in memory 22. One or more antennas may be used for signal transmission and reception. The full-duplex radio 10 may include components such as filters, converters (e.g., digital-to-analog converters and the like), mappers, signal shaping components. Fast Fourier Transform ("FFT") modules, etc., to generate signals for transmission via one or more downlinks and reception via one or more uplinks. In some implementations, the full-duplex radio 10 is compatible with one or more of WiFi™, Bluetooth®, GSM EDGE Radio Access Network ("GERAN"), Universal Terrestrial Radio Access Network ("UTRAN"), and Evolved Universal Terrestrial Radio Access Network ("E-UTRAN"); the full-duplex radio 10 may additionally or alternatively be compatible with any other suitable standards. The full-duplex radio 10 can be configured to perform one or more aspects of the subject matter described herein. Although not shown, in one embodiment, a processor/computer or computer system may be programmed to perform the operations of and thus be used in place of controller 20 and digital canceller 18.

Many conventional devices operate on contiguous spectrum bands and are therefore unable to take advantage of fragmented spectra. Some conventional devices include modified physical layers ("PHY") and media access control ("MAC") layers (also referred to as higher layers) so that they can operate on fragmented spectra. Such modifications may include the use of a wideband orthogonal frequency division multiplexing ("OFDM") PHY layer that uses only subcarriers that are in the empty spectrum fragments and a modified MAC layer to ensure that all available spectrum fragments are utilized fully. However, because conventional radios cannot transmit and receive simultaneously over arbitrary different bands, these devices cannot exploit fragmented spectrum without significant complexity and reductions in performance. As more conventional devices connect to a network, complexity of such distributed coordination grows, leading to inefficient spectrum utilization.

Functionalities of a communications system are governed by the Open Systems Interconnection ("OSI") model (ISO/IEC 7498-1), whereby functions of the communications system are grouped in terms of abstraction layers. There are seven layers in the OSI model, which include:

a physical layer (PHY) that defines electrical and physical specifications for devices (e.g., it defines the relationship between a device and a transmission medium), a data link layer that provides functional and procedural means to transfer data between network entities and to detect and correct errors that occur in the physical layer (e.g., it can include the following functionalities/sub-layers: framing, physical addressing, flow control, error control, access control, and media access control (MAC)), a network layer that provides functional and procedural means of transferring variable length data sequences from a source host on one network to a destination host on a different network while maintaining the quality of service requested, by the transport layer, a transport layer that provides transparent transfer of data between end users, thereby providing reliable data transfer services to the upper layers, a session layer that controls connections between computers, establishes, manages and terminates connections between local and remote applications, provides for full-duplex half-duplex, or simplex operation, and establishes check-pointing, adjournment, termination, and restart procedures, a presentation layer that establishes context between application-lay entities, in which the higher-layer entities use different syntax and semantics if the presentation service provides a mapping between them, and an application layer, which is the OSI layer closest to the end user, whereby the OSI application layer and the user interact directly with the software application.

The full-duplex signal shaping system (and methods for full-duplex signal shaping) may be used in communication devices. Exemplary communication devices may include receiver circuitry that can receive signals transmitted by another communication device, transmitter circuitry that can transmit signals for reception by another communication device, and various processing circuitry that can process received signals, prepare signals for transmission, and/or perform various other functions. Exemplary communication devices may include a mobile telephone, a Bluetooth® enabled device, a ZigBee® small low-power digital radio, a GPS device, a two-way radio, such as Land Mobile, Family Radio Service ("FRS") and General Mobile Radio Service "GMRS") radios, and/or any other devices. The full-duplex signal shaping system can perform at least one of the following functions: full-duplex operation and dynamic signal shaping. The following is a brief discussion of each of these functions.

In some implementations, during full-duplex operation, a full duplex radio of a preferred embodiment may allow higher layers (e.g., PHY, MAC, etc.) of the communication device to simultaneously transmit and receive on arbitrary but different sets of spectrum fragments of the wireless spectrum. Through full-duplex signal shaping, the full-duplex radio may reduce receiver saturation during such simultaneous receive/transmit operations.

In some implementations, a full-duplex signal shaping system may include a programmable digital filter to shape signals in order to fit available spectrum fragments across a frequency band of interest. This can allow for efficient operation given the dynamic nature of the available spectrum fragments as well as their ability to change over time.

In some implementations, a full-duplex signal shaping system may include a self-interference cancellation mechanism that can reduce an amount of self-interference and reduce the risk of saturation of an analog-to-digital converter in the receive circuitry of a full-duplex radio. The self-interference cancellation mechanism preferably does not leak interference into adjacent band or otherwise negatively affect receive performance. The self-interference cancellation mechanism preferably includes a reconfigurable filter engine that can provide efficient and programmable digital filtering.

The full-duplex signal shaping system achieves full-duplex operation over different but arbitrary spectrum fragments by cancelling self-interference present in analog receive signals instead of simply filtering it. The self-interference signal can be subtracted from the received signal, reducing the effect of self-interference on the received signal and avoiding receiver saturation. The full-duplex signal shaping system is adapted to determine the amount of cancellation needed to reduce the risk of receiver saturation. The full-duplex signal shaping system determines the threshold cancellation value based on at least one of the dynamic range of the ADC and the range of expected signal strengths.

Dynamic range ("DR") is defined as the ratio between largest and smallest possible values of a variable of interest. At the transmitter, the dynamic range of the DAC can determine the maximum ratio between the powers of the strongest and weakest transmissions. At the receiver, the ADC's dynamic range can define the maximum ratio between the strongest and weakest received signal power. When the dynamic range is exceeded, the converter's quantization noise can bury weaker signals. The dynamic range of the ADC can be calculated through the following expression:

$$DR(dB)=6.02n+1.76$$

where n is the resolution of the ADC (in bits). Higher dynamic ranges may increase ADC performance. Some embodiments of system 300 use 12-bit DACs/ADCs, providing approximately 74 dB of dynamic range.

At the transmitter, the maximum ratio of transmit powers across different fragments will rarely exceed, for example, 30 dB, so DAC dynamic range is usually not a concern. On the other hand, if the transmitter is operating while the system attempts to receive, the dynamic range of the ADC at the receiver can be critical because the transmitted signal may be much stronger than the received signal. To estimate the required ADC dynamic range, the range of expected signal strengths can be calculated. Assuming that the transmit and receive antennas are reasonably separated, the attenuation between the two due to path loss can be calculated as follows:

Path Loss (dB)=36.56+20 $\log_{10} f$+20 $\log_{10} d$ where f is the carrier frequency in MHz and d is the distance in miles. Assuming that the transmit and receive antennas are separated by 10 cm, the path loss between transmitter and receiver is approximately, for example, 23 dB; a maximum output from a WiFi 2.4 GHz antenna is approximately 23 dBm. Because a typical thermal noise-floor for WiFi systems is approximately −95 dBm, for example, the power of the weakest decodable signal is −90 dBm (according to IEEE 802.11 standard, the lowest signal-to-noise ratio is approximately 5 dB).

Based on these calculations, the estimated amplitude of the self-interference signal at the receiver is 0 dBm, assuming 23 dBm transmit power, the maximum in WiFi. Thus, ADC 64 may require, for example, 90 dB in dynamic range in order to simultaneously transmit and receive. Relatedly, it is expected that the amount of cancellation required is negatively correlated to ADC resolution.

In some implementations, to avoid interference leakage, passive components that do not introduce distortion may be used in the full-duplex signal shaping system. The full-duplex signal shaping system can provide for cancellation of a certain amount of signal power (e.g., 20-25 dB of cancellation compared to the 35 dB required for single-channel full-duplex). Hence, precise delay matching with the over-the-air transmitted signal may not be needed.

Figure 2:
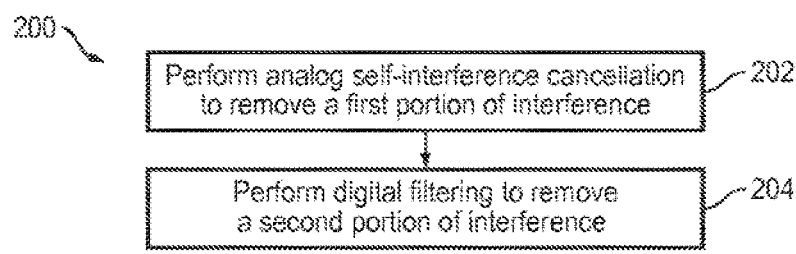
FIG. 2 is an exemplary flowchart for performing full-duplex self-interference cancellation, in accordance with one embodiment of the present invention.

FIG. 2 is a flowchart 200 for performing full-duplex signal shaping so as to achieve analog self-interference cancellation, in accordance with one embodiment of the present invention. At 202, a first portion of interference from the received signal is removed or cancelled. Interference may be caused by the transmitted signal and affect the received signal e.g., interference may comprise self-interference). Such interference may be cancelled using the analog self-interference cancellation block 16 or any other suitable interference-cancelling system.

At 204, a second portion of the interference is removed from the received signal. This may be achieved using the digital canceller 18 shown in FIG. 1 or any other digital interference cancellation circuit. In some implementations, the portion of the interference to be cancelled may be set by a power threshold (which specifies how much power is to be removed from the received signal). The power threshold may be determined based on at least one of the following: dynamic range of at least one of the received and transmitted signals, and a range of expected signal strength. The dynamic range of the received signal may be determined based on a ratio of powers of a strongest received signal and a weakest received signal. The dynamic range of the transmitted signal may be determined based on a ratio of powers of a strongest transmitted signal and a weakest transmitted signal. The range of expected signal strength may be determined based on a distance separating the transmitting antenna and a receiving antenna.

In some implementations, the digital cancellation may include performing at least one of the following operations: sampling of the received signal, down-converting the sampled received signal into a narrowband stream, and filtering the down-converted signal to remove the second portion of the interference. Digital cancellation may also include performing at least one of the following operations: up-converting the transmitted signal and filtering the up-converted signal to prevent aliasing of the transmitted signal with at least another signal. Filtering may achieved using a finite impulse response filter, an infinite impulse response filter, a resampling filter, or otherwise. In some embodiments, the digital cancellation may include mapping at least one signal received from at least one communication protocol layer to at least one frequency fragment in a wireless frequency band for transmission by the transmitting antenna.

Figure 3:
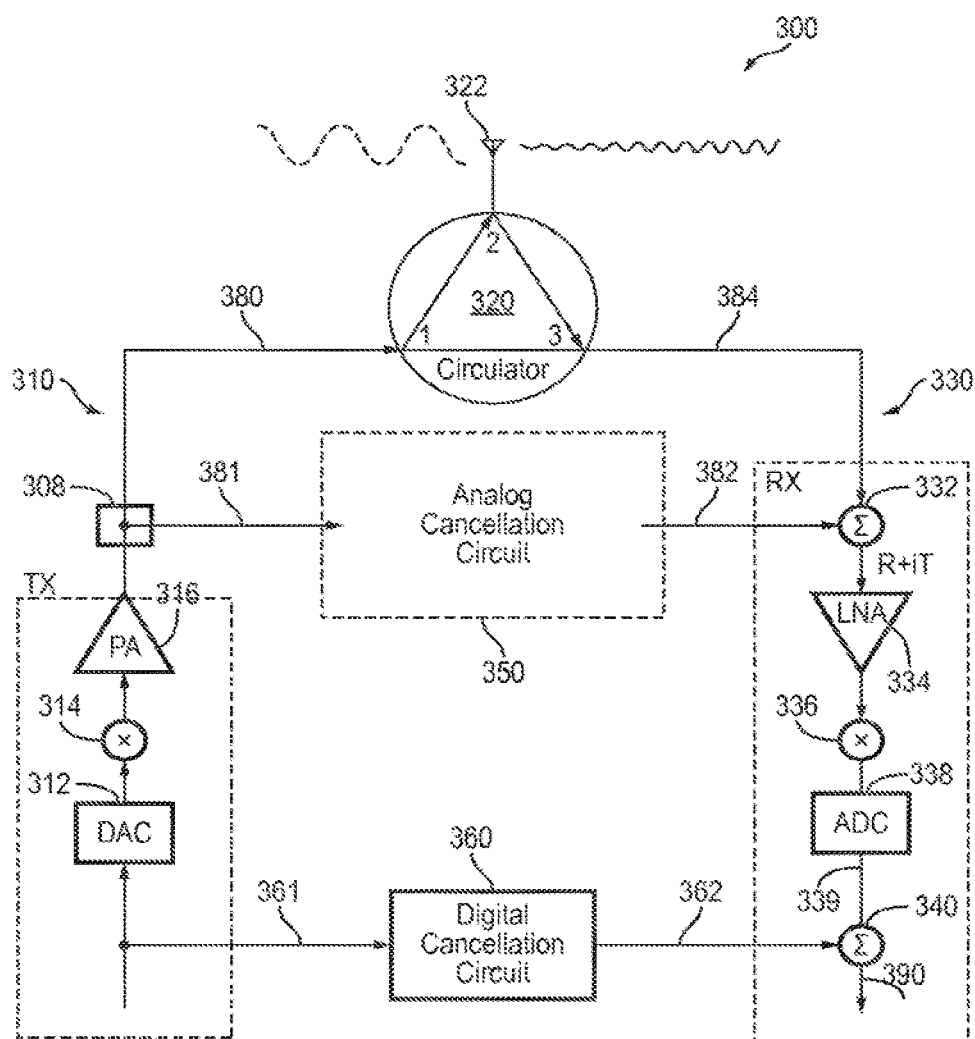
FIG. 3 is an exemplary block diagram of a full-duplex wireless communication system, in accordance with another embodiment of the present invention.

FIG. 3 is a simplified block diagram of a full-duplex wireless communication system 300, in accordance with one exemplary embodiment of the present invention. Wireless communication system 300 may be a multiple-access system capable of supporting communication with multiple users by sharing the available system resources. Examples of such wireless systems include code division multiple access (CDMA) systems, time division multiple access (TDMA) systems, frequency division multiple access (FDMA) systems, Long Term Evolution (LTE) systems, orthogonal frequency division multiple access (OFDMA) systems, or the like. Wireless communication system 300 (herein alternatively referred to as system) may be a cellular phone, a base station, an access point, or the like.

Wireless communication system 300 is shown, as including, in part, a transmit path 310, a receive path 330, an analog cancellation circuit 350, a digital cancellation circuit 360, and a circulator 320 adapted to isolate the receive path from the transmission path. The wireless communication system 300 is shown to include a single antenna 322, a single transmit chain and a single receive chain (e.g., single input single output (SISO) system). As will be discussed later, similar methods may be used in a multiple input multiple output (MIMO) system without departing from the teachings of the present disclosure.

Ports 1 and 3 of circulator 320 are shown as being respectively coupled to the transmit path 310 and receive path 330. Receive path 330 is further shown as including, in part, a combiner 332, a low-noise amplifier (LNA) 332, a frequency down-converter 336, an analog-to-digital converter ADC 338, and a combiner 340. Transmit path 310 is shown as including a digital-to-analog converter (DAC) 312, a frequency upconverter 314, and a power amplifier (PA) 316. A power splitter 308 is adapted to split and deliver a first portion of the transmit signal 380 to antenna 322 via circulator 320, and a second portion of the transmit signal 381 to analog cancellation circuit 350. Power splitter 308 may be a passive component. In one embodiment, digital cancellation circuit 360 may be a processor/computer or computer system.

As shown, DAC 312 is adapted to convert the digital baseband transmit signal to an analog signal and deliver the converted analog signal to frequency upconverter 314. A filter (not shown) may be coupled to DAC 312 for filtering the analog signal. The fitter may be a surface acoustic wave (SAW) filter or any other type of filter. Frequency upconverter 314 upconverts the frequency of the received signal to that of an RF signal and delivers the frequency upconverted signal to PA 316. A first portion of output signal 380 of PA 316 is delivered to antenna 322 via circulator 322 for radio transmission, and a second portion of output signal 381 of PA 316 is delivered to analog cancellation circuit 350.

As described further below, combiner 332 subtracts signal 382-generated by analog cancellation circuit 350—from signal 384 that is received by antenna 322 and delivered to receive path 330 via circulator 320. Combiner 332 delivers the resulting signal to LNA 334 which is adapted to amplify and deliver the amplified signal to frequency downconverter 336. Frequency downconverter 336 is adapted to downconvert the frequency of the signal it receives to a baseband or an intermediate frequency and deliver the frequency downconverted signal to ADC 338. In response, ADC converts the analog signal it receives to a digital signal and delivers this signal to combiner 340. As is also further described below, combiner 340 subtracts signal 362 generated by digital cancellation circuit 360—from the output signal 339 of ADC 338 to generate output signal 390 which is representative of the desired receive signal received by antenna 322.

Signal 384 received at port 3 of circulator 320 includes the desired receive signal as well as a portion of transmit signal 380 leaking from port 1 to port 3 of circulator 320. Circulator 320 provides isolation between its ports 1 and 3 and thus reduces the self-interference signal leaking to the receive path by, for example, 15 dB. Analog cancellation circuit 350 disposed between the transmit path 310 and receive path 330—further reduces the self-interference signal, thus preventing LNA 334 from being otherwise saturated by the transmit signal leaking into the receive path. To achieve this, analog cancellation circuit 350 is adapted to generate signal 382 which is representative of the self-interference signal—and deliver signal 382 to combiner 332. In response, combiner 332 subtracts signal 382 from the received signal 384 thereby to reduce (e.g., by 50 dB) the self-interference signal in the receive path. To further reduce the self-interference signal from the receive signal, digital cancellation circuit 360 is adapted to generate and deliver to combiner 340 signal 362 from the baseband transmit signal. In response, combiner 340 subtracts signal 362 from signal 339 thereby to remove (e.g., by 50 dB) the remaining portion of the self-interference signal in the receive path. Digital cancellation circuit 360 may be implemented in hardware, software or any combination thereof, such a central processing unit or any other digital processor.

Figure 4:
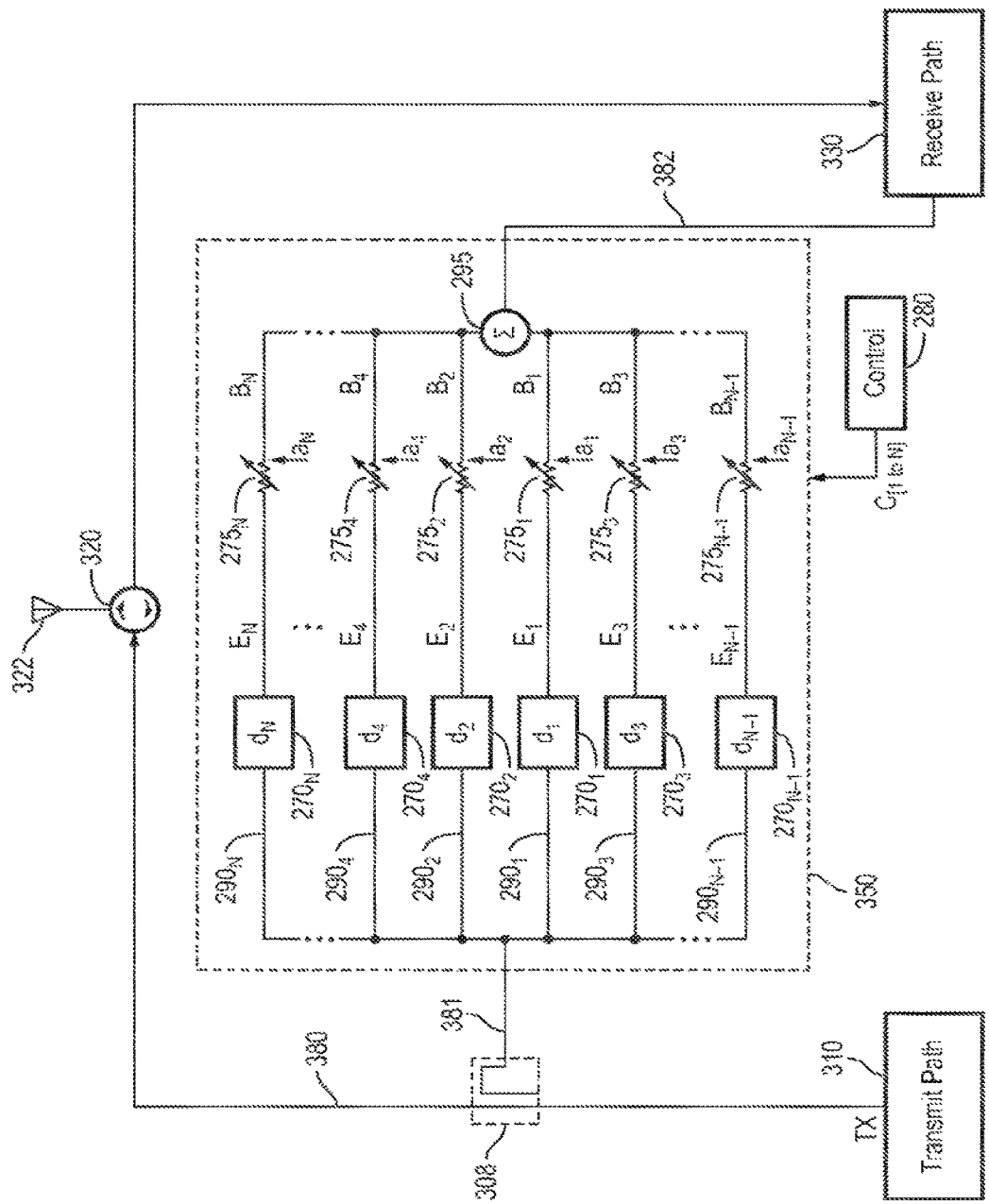
FIG. 4 is an exemplary schematic diagram of an analog self-interference cancellation circuit, in accordance with another embodiment of the present invention.

FIG. 4 is a simplified block diagram of an exemplary analog cancellation circuit 350, in communication with a transmit path 310 and a receive path 330. Antenna 322 is coupled to both the receive and transmit paths via circulator 320. As described above, a portion of the transmit signal leaks into and is present in the receive signal in the form of a self-interference signal. Cancellation circuit 350 is adapted to generate a signal 382 that represents the self-interference signal. The self-interference signal 382 is subtracted from the received signal 384 in receive path 330, as described above in reference to FIG. 3.

As shown, cancellation circuit 350 receives a sample 381 of the transmit signal via, signal splitter 308. Cancellation circuit 350 is shown as including a multitude of paths $290_1$, $290_2 \ldots 290_{N-1}$, $290_N$, where N is an integer greater than or equal to 2. Each path is shown as including a delay element $270_i$, where i is an index varying from 1 to N, and a variable attenuator $275_i$. The delay elements $270_i$ may generate a fixed or a variable delay. The level of attenuation of each variable attenuator $275_i$ may be varied in accordance with a predefined algorithm implemented by controller 280. Each delay element $270_i$ is adapted to generate a signal $E_i$ that is a delayed version of signal 380. Each variable attenuator $275_i$ is adapted to attenuate the amplitude of the signal $E_i$ it receives in accordance with the control signal $a_i$ applied thereto by controller 280 so as to generate an attenuated (weighted) signal $B_i$. Accordingly, signals $B_i$ are different delayed and weighted versions of signal 380.

Combiner 295 combines signals $B_i$ to generate signal 382 which is representative of the self-interference component of the transmit signal. In one embodiment, combiner 295 is an adder adding signals $B_i$ to generate signal 382. In other embodiments, combiner 295 may perform other arithmetic or logic functions on signals $B_i$ to generate signal 382. In one embodiment, a processor/computer may be configured to perform the operations of and thus be used in place of controller 280. In yet another embodiment, a processor/computer may be configured to perform the operations of and thus be used in place of both controller 280 and digital cancellation circuit 360.

As described above, cancellation circuit 350 reconstructs the self-interference signal from the signal values present on paths (alternatively referred to herein as "taps" or "filter taps") $290_i$. Since both the self-interference signal and the time-delayed, weighted signals $B_i$ present on the taps are samples of the same transmit signal, the reconstruction of the self-interference signal is similar to band-limited interpolation. Furthermore, since only a finite number of taps are available, a windowed interpolation may be used to reconstruct signal 382 representative of the self-interference signal. Therefore, the signal representative of the self-interference signal, in accordance with one embodiment of the present invention, is generated from signals $B_i$ that are delayed and attenuated (weighted) versions of the sampled transmit signal 380.

To generate a signal representative of the self-interference signal, in accordance with one exemplary embodiment, the delays generated in each pair of associated paths (taps) $290_i$ are selected such that the arrival time of the self-interference signal at receive path 330 falls within the difference between these two delays (also referred to herein as the delay window). Accordingly, the delay generated by a first tap in each pair of associated taps $290_i$ is less than the arrival time of the self-interference signal at receive path 330 (referred to herein as $T_{self\_int}$) and the delay generated by a second tap in each pair of associated taps $290_i$ is greater than $T_{self\_int}$. In one embodiment, the center two taps, namely taps $290_1$ and $290_2$, form the first pair of associated taps such that, for example, the delay $TL_1$ generated by delay element $270_1$ is less than $T_{self\_int}$ and the delay $TH_1$ generated by delay element $270_2$ is greater than $T_{self\_int}$. $TL_1$ and $TH_1$ are thus selected to be the closest such delays to $T_{self\_int}$. The next two taps closest to the center taps, namely taps $290_3$ and $290_4$, form the second pair of associated taps such that, for example, the delay $TL_2$ generated by delay element $270_3$ is less than $T_{self\_int}$ and the delay $TH_2$ generated by delay element $270_4$ is greater than $T_{self\_int}$. $TL_2$ is shorter than $TL_1$, and $TH_2$ is longer than $TH_1$, therefore, $TL_2$ and $TH_2$ are selected to be the second closest such delays to $T_{self\_int}$. The delay of the remaining pairs of associated taps are similarly selected and thus are not described herein. It is understood that in other embodiments, associated taps may be arranged and selected differently. For example, in another embodiment, taps $290_1$ and $290_4$ may be selected as associated taps and used to form a delay window.

The following description is made with reference to an arrangement according to which the center taps $290_1$ and $290_2$ form the first pair of associated taps, the next two taps $290_3$ and $290_4$ form the second pair of associated taps, the next two taps $290_5$ and $290_6$ form the third pair of associated taps, . . . , and the last two taps $290_{N-1}$ and $290_N$ form the last pair of associated taps, as described above. Furthermore, in the following, the delays and interpolations associated with only 2 pairs of associated taps, namely associated taps $290_1/290_2$ and associated taps $290_3/290_4$ are described. It is understood, however, that similar operations may be performed for all other taps regardless of the number of taps disposed in attenuation and delay circuit 350.

It should be noted that although the example shown in FIG. 4 uses delay elements and variable/programmable attenuators to implement each filter tap, in general, any other method and/or configuration of elements may be used to design the filters used in the cancellation circuits without departing from the teachings of the present disclosure. In one example, the filter taps may include a combination of tunable capacitors and delays. In another example, each of the filter taps may include a combination of gain elements such as amplifiers, resistors and delays. In yet another example, one or more of the filter taps may include a phase shifter in addition to the variable attenuators and/or delays.

Figure 5:
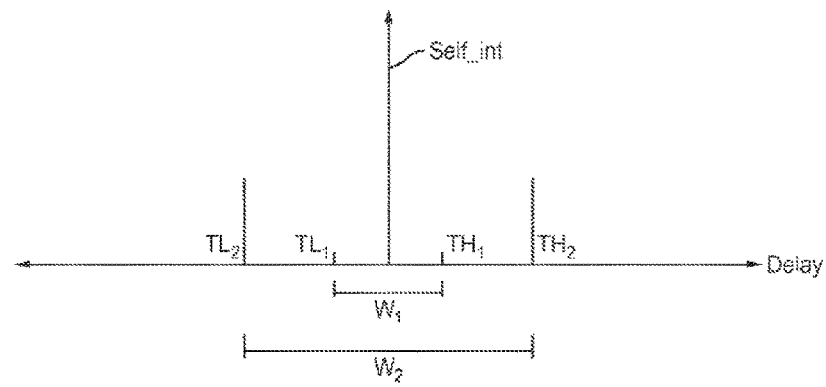
FIG. 5 shows exemplary arrival times of a number of delayed and attenuated signals generated by the analog self-interference cancellation circuit of FIG. 4 relative to that of the self-interference signal, in accordance with an embodiment of the present invention.

FIG. 5 shows exemplary arrival times of a number of delayed and attenuated signals generated by the analog self-interference cancellation circuit of FIG. 4 relative to that of the self-interference signal, in accordance with an embodiment of the present invention. As shown, $TL_1$ represents the time around which signal $B_1$ is generated (the delays across attenuators $275_i$ are assumed to be negligible relative to the delays across delay elements $270_i$), $TH_1$ represents the time around which signal $B_2$ is generated, $TL_2$ represents the time around which signal $B_3$ is generated, and $TH_2$ represents the time around which signal $B_4$ is generated. As is seen, time delays $TH_1$ and $TL_1$ are selected (using delay elements $270_1$ and $270_2$) such that $T_{self\_int}$ falls within the window $W_1$ defined by the difference $TH_1$-$TL_1$. Likewise, time delays $TH_2$ and $TL_2$ are selected such that $T_{self\_int}$ falls within the window $W_2$ defined by the difference $TH_2$-$TL_2$. Accordingly, as described above, for each pair of associated taps defining a window, the amount of delay generated by one of the delay paths is longer than $T_{self\_int}$, and the amount of delay generated by the other one of the delay paths is shorter than $T_{self\_int}$. For example, referring to window $W_1$, $TH_1$ is greater than $T_{self\_int}$ and $TL_1$ is smaller than $T_{self\_int}$. Although the above description is made with reference to paths $290_1$, $290_2$, $290_3$, and $290_4$ only, it is understood that all the tap delays are selected such that $T_{self\_int}$ falls either within a window defined by any pair of associated paths. If the attenuation and delay path 350 includes an odd number of paths (e.g., N is an odd number), (N−1) of the delay path may be used to form associated pairs, as described above. The delay $T_N$ associated with the last remaining delay path (the Nth path) is selected such that $T_{self\_int}$ falls within a time from $T_N$.

To determine the level of attenuation for each attenuator $275_i$, in accordance with one exemplary embodiment of the present invention, sinc interpolation is used; it is however understood that any other interpolation scheme may also be used. To achieve this, for each window, the intersection of a pair of sinc functions—each centered at one of the window boundaries and each having a peak value substantially equal to the peak value of an estimate of the self-interference signal—and the estimate of the interference signal, shown as Self_int, is determined.

Figure 6:
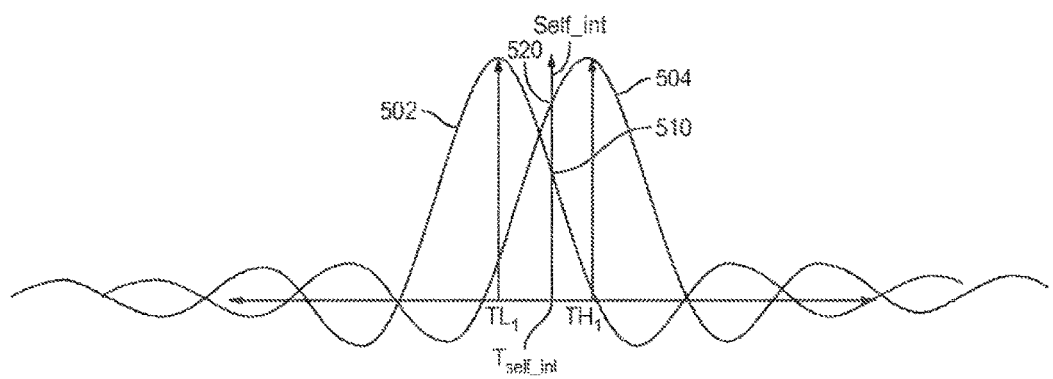
FIG. 6 shows an exemplary sinc interpolation process for determining attenuation values applied to a first pair of attenuators of FIG. 4, in accordance with an embodiment of the present invention.

FIG. 6 shows an exemplary sinc interpolation process for determining attenuation values applied to attenuators of FIG. 4, in accordance with an embodiment of the present invention. In this example, sinc function 502 centered at $TL_1$ intersects the estimate of the self-interference signal Self_int at point 510, and sinc function 504 centered at $TH_1$ intersects signal Self_int at point 520. The heights of points 510 and 520 define the level of attenuations applied to attenuators $275_1$ and $275_2$, respectively.

Since the amplitude and delay of the self-interference signal is not known in advance, as described above, an estimate (signal Self_int) of both the delay and amplitude of the self-interference signal is initially used by control block 280 for interpolation. As described further below, the initial estimates are used to determine the attenuation levels of the attenuators $275_i$, thereby to generate signals $B_i$ which are subsequently combined to generate signal RX_RC. The amount of self-interference at the receiver is then measured to determine whether one or more conditions are satisfied. One such condition may be to determine whether the amount of self-interference has reached below a minimum threshold level. If the condition(s) is not met, an iterative optimization algorithm is performed by control block 280 to arrive at new estimate(s) for either the delay or amplitude, or both the delay and amplitude, of the self-interference signal. The new estimate(s) are subsequently used, as described further below, to generate new attenuation levels for the attenuators, in turn resulting in generation of revised signals $B_i$ as well as revised self-interference signal. The process of measuring the level of the self-interference signal being canceled or reduced at the receiver, arriving at a new estimate for the self-interference signal based on such measurement, and varying the attenuation levels of the attenuators in response continue until the predefined condition(s) is met.

Figure 7:
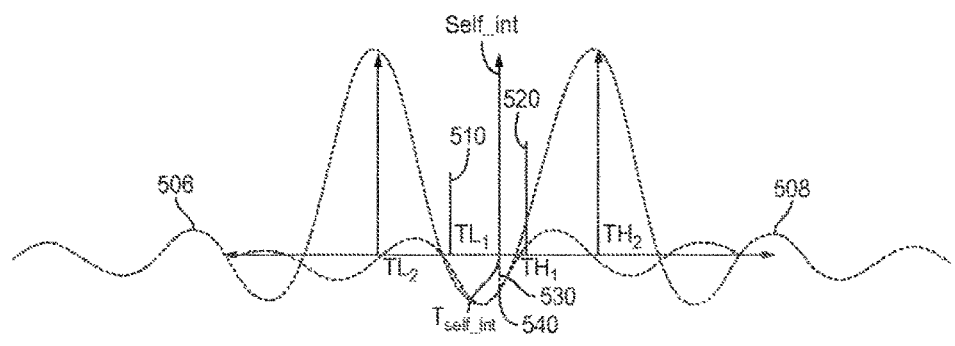
FIG. 7 shows an exemplary sinc interpolation process for determining attenuation values applied to a second pair of attenuators of FIG. 4, in accordance with an embodiment of the present invention.

FIG. 7 shows the intersection of sinc functions positioned at the window boundaries $TL_2$ and $TH_2$ with the self-interference signal. As is seen, sinc function 506 centered at $TL_2$ is seen as intersecting the self-interference signal at point 530, and sinc function 508 centered at $TH_2$ is seen as intersecting the self-interference signal at point 540. The heights of points 530 and 540 define the level of attenuations applied to attenuators $275_3$ and $275_4$, respectively. As is seen in FIG. 7, the attenuation levels applied to attenuators $275_1$, $275_2$ have positive values (have a positive polarity), whereas the attenuation levels applied to attenuators $275_3$, $275_4$ have negative values and thus have a negative polarity. It is understood that the attenuation levels for the remaining taps are similarly determined. Further details regarding the application of the sampling theory to reconstruct a sampled signal is provided in "Multirate Digital signal Processing" by Ronald E. Crochiere, and Lawrence R. Rabiner, Prentice-Hall Processing series, 1983, the content of which is incorporated herein by reference in its entirety.

Referring back to FIG. 4, combiner 295 is adapted to combine signals $B_1$, $B_2$ . . . $B_N$ thereby to generate signal RX_RC representative of the self-interference signal. As the delay of the self-interference signal changes and its position within the windows moves, the intersections of the self-interference signal and the sine functions change, thereby causing the attenuation levels to change, which in turn causes the reconstructed signal representative of the self-cancellation signal to also change to track the self-interference signal.

The higher the number of taps, the greater is the amount of self-interference. In one example, the amount of self-interference cancellation for two taps and ten taps are respectively approximately −30 dB and −75 dB. In other words, by increasing the number of taps, self-interference cancellation on a wider bandwidth is achieved.

Dynamic Adaptation of Analog Self-Interference Cancellation Tuning

In accordance with one aspect of the present invention, variable attenuators $275_i$ as shown in FIG. 4 (collectively referred to herein using reference numeral 275) are dynamically tuned (programmed) using a fast algorithm to maximize the self-interference cancellation, as described further below. Assume y(t) represents the self-interference signal, $d_1, \ldots, d_N$ represent delays associated with delay elements $270_i$ shown in FIG. 4, and c(t) represents the reference signal 381 tapped from the transmit path, as is also shown in FIG.

4. Attenuation values $a_1, \ldots, a_N$ are selected so as to minimize the self-interference signal, in accordance with the expression below:

$$\min_{a_1,\ldots,a_N} \left(y(t) - \sum_{i=1}^{N} a_i c(t - d_i)\right)^2$$

In accordance with one aspect of the present invention, self-interference signal y(t) is modeled in the frequency domain as a function of the tapped signal c(t) as shown in expression below:

$$Y(f) = H(f)C(f)$$

where H(f) is the frequency domain representation of the distortion introduced by such components as the isolator (e.g., circulator 320), the antenna and the environment, and where C(f) is the frequency domain representation of the tapped, signal 381.

Frequency response H(f) may be measured relatively quickly. As is well known, many wireless communication protocols include known preamble codes (e.g., preamble symbols or training sequence) at the beginning of each packet. Preamble codes (symbols) often contain pilot tones having predetermined frequencies and phases and are generally used by a receiver to determine a carrier frequency offset with respect to an oscillator frequency of the receiver. The frequency response H(f) is a fast Fourier transform (FFT) of the self-interference channel which can be measured using the preamble codes (alternatively referred to hereinafter as preamble, preamble symbols, training sequence, training symbols), as is performed in the OFDM standard. The following description of the dynamic analog cancellation is provided with reference to the WiFi standard. It is understood however that embodiments of the present invention are not so limited and that any other communications protocol may also be used to determine frequency response H(f).

The attenuator values are then selected such that the overall frequency domain response of cancellation circuit 350 approximates H(f) as closely as possible. The above optimization problem may then be restated as follows:

$$\min_{a_1,\ldots,a_N}(H(f) - \Sigma_{i=1}^{N} H_i^{a_i}(f))^2 \quad (1)$$

where $H_i^{a_i}(f)$ is the frequency response for delay line i for attenuation setting of $a_i$.

To determine $H_i^{a_i}(f)$, in accordance with one aspect of the present invention, the frequency response of the delay line i (tap) is measured at one attenuation while the attenuation levels of the remaining delay lines are set to their highest value. Accordingly, none of the delay lines except the one being measured is enabled to substantially pass a signal. The scattering or S parameters of the attenuator, which is commercially available from the manufacturers may then be used to compute the relative change in frequency response of the delay line i for all attenuation values. The S-parameters which provide the relative change in frequency response with changing attenuation values may also be measured using a vector network analyzer as known in the art.

To account for manufacturing variability of the attenuators as well as any possible signal flow through the attenuators whose attenuation levels have been set to their highest value, a least squares fit is applied to the collected data so as to find a more accurate response for the attenuators. Using this process, which is performed once for all the delay lines, the frequency response of all the delay lines for all attenuation values of interest (e.g., 128) is determined. To the extent that the frequency response of the delay lines and the attenuation values are independent of the environment, this data may be stored in a memory for future use.

After obtaining the frequency response $H_i^{a_i}(f)$ for each delay line, the following algorithm, in accordance with one embodiment of the present invention, is performed to optimize the attenuation settings so as to maximize the self-interference cancellation.

First, as was described above, the Frequency response H(f) is measured using the preamble, for example, the WiFi preamble. Thereafter, expression (1), shown above, is solved by relaxing it to a linear program as shown below:

$$\rho_j^i, \forall i, j, \text{ s.t. } i \in \{1, \ldots, N\}, \quad (2)$$

$$j \in \{1, \ldots, 128\} \min \left(H(f) - \sum_{i=1}^{N} \rho_j^i H_i^{a_j}(f)\right)^2$$

subject to, $\rho_j^i \in \{0, 1\} \forall i, j$ $$\sum_{j=1}^{128} \rho_j^i = 1, \forall i$$

where $\rho_j^i$ can be relaxed to a continuous variable from [0,1].

Expression (2) can be formed as a convex problem as follows:

$$\rho_j^i, \forall i, j, \text{ s.t. } i \in \{1, \ldots, N\},$$

$$j \in \{1, \ldots, 128\} \min \left(H(f) - \sum_{i=1}^{N} \rho_j^i H_i^{a_j}(f)\right)^2$$

subject to, $0 < \rho_j^i < 1, \forall i, j$ $$\sum_{j=1}^{128} \rho_j^i = 1, \forall i$$

Random rounding is used on $\rho_j^i$ to find a solution for the attenuator settings to achieve the required cancellation level, e.g., 60 dB. The algorithm described above reduces the search space of the attenuator values to a polynomial set compared to the exponential search space. Since the above-described calculations in performing this algorithm are carried out offline and implemented using the frequency response model (e.g., by looking up the frequency response of the circuit for any combination of attenuator values stored in the memory), the algorithm is relatively fast. In one example, it takes less than 1 μsec to find the optimized attenuation values.

To further improve self-interference cancellation and account for variation in the manufacture of the attenuators and the S parameter data provided by the manufacturers, an additional gradient descent algorithm may be used to further optimize the attenuation values. Typically, a gradient descent algorithm takes several hundreds of iterations to converge. However, in accordance with embodiments of the present invention, since the optimization algorithm described herein provides the descent from a much closer starting point, the gradient descent converges to the required point in, for example, 10-12 iterations. Accordingly, even assuming that the analog cancellation tuning takes 900-1000 μsec and that tuning is required once every 100 msec, analog cancellation tuning, in accordance with the present invention, adds less than 1% to the entire tuning cycle.

In accordance with another embodiment of the present invention, the analog cancellation tuning, which may be performed periodically, is further reduced by two orders of magnitude, as described further below. An analog cancellation circuit, in accordance with embodiments of the present invention, may be viewed as a filter whose response is tuned so as to match as closely as possible to the frequency response of the self-interference channel. To achieve this, the frequency response of the cancellation circuit for different combinations of attenuator values is first determined, as described above to form a matrix A each column of which is a frequency response for a particular value of an attenuator at K different frequencies in the band of interest (e.g., K=128 for a 20 MHz bandwidth in the current prototype). Assuming) H(f) is the frequency response of the channel experienced by the received interference signal in the frequency domain (e.g., the Channel as represented by the antenna, circulator and any strong environmental reflections), the analog cancellation tuning problem reduces to the efficacy of the tuning that depends on the accuracy in the measurement of H(f).

As described above, the frequency response of the channel H(f) may be measured using the preamble of the received interference signal y(t) (e.g., the first two OFDM symbols of a transmitted WiFi packet which are known as preamble symbols). The accuracy in measuring H(f) is however limited by the nonlinearities in the transmit-receive path that may be lower than the transmitted signal by, e.g., 30 dB. In accordance with one embodiment of the present invention, H(f) is measured accurately and relatively quickly to tune the analog cancellation circuit. Assume x(t) is the baseband signal that is being transmitted after upconversion and amplification, the transmitted signal $x_{tx}(t)$ may be written as shown below:

$$x_{tx}(t) = x(t) + a_3 x(t)^3 + a_7 x(t)^7 + \ldots + w(t)$$

where K represents the higher order harmonics.

The nonlinear components and the noise w(t) of the above expression are u known. Signal $x_{tx}(t)$ is further flows through the circulator and the antenna, collectively represented by channel H(f). Signal Y(F) received at the receiver may thus be defined as shown below:

$$Y(f) = H(f) * F(x(1) + a_3 x(t)^3 + \ldots) + \text{phase noise} \quad (3)$$

In the above expression, parameter $a_3$ is around $10^{(-30/20)}$, e.g., it is 30 dB lower that than x(t), and phase noise distortion is 40 dB lower than the signal level of x(t). One aspect of the embodiments of the present invention, uses x(t) to estimate the channel II (f). It is understood that other terms in the received interference signal may limit the accuracy of the estimation to, for example, 30 dB (the estimation noise is 30 dB lower).

In accordance one embodiment of the present invention, H(f) is estimated iteratively. As is well known, the WiFi preamble, as defined for example in IEEE 802.11g and IEEE 802.11n standards, has two OFDM symbols, each with a duration of 4 μsec. After receipt of the first transmitted OFDM symbol, the expression is solved for Y(f) to generate a first estimate $h_a$ of the interference channel h, which may be defined as shown below:

$$h_a = h + e_1$$

where $e_1$ represents the difference (error) between $h_a$ and h, and is lower than h by, e.g., 30 dB.

In one embodiment, an off-line algorithm, such as Expression (1) shown above, is used to optimize the following expression:

$$\min_x \|h_a - A*x\|^2 \quad (4)$$

to estimate a solution $\hat{x}$ for x that minimize expression (4). The attenuator is then tuned, as described above, assuming that $\hat{x}$ is the transmitted signal. Accordingly, a self-interference cancellation of e.g., 30 dB, is achieved. The channel is now assumed to be represented by h−A*$\hat{x}$. Thereafter, the second OFDM symbol is transmitted and the channel response is measured. The channel may be represented as:

$$h_b = (h - A\hat{x}) + e_2 \quad (5)$$

Accordingly, $e_2$ is lower than h−A$\hat{x}$ by, e.g., 30 dB, and h−A$\hat{x}$ is lower than h by the same amount of e.g., 30 dB. Accordingly, given the above example, $e_2$ is 60 dB lower than h by, e.g., 60 dB. Assume further that:

$$\tilde{h} = h_b + A*\tilde{x}$$

$$\tilde{h} = h + e_2$$

Thus, with the second estimate $\tilde{h}$ of h that has an error of, for example, 60 dB lower, the optimization algorithm is returned to find a second estimate of $\tilde{x}$ of x, to provide, for example, 60 dB cancellation or reduction in the channel response. Consequently, in accordance with one embodiment of the present invention, a cancellation of, for example, 60 dB is achieved in nearly 8 μsec. Assuming that the circulator provides a cancellation of 15 dB, and the analog cancellation circuit provides another, for example 55-60 dB, of cancellation, a total cancellation of 70-75 dB is achieved by tuning the attenuators with two preamble symbols within nearly 8 μsec time period.

Figure 8:
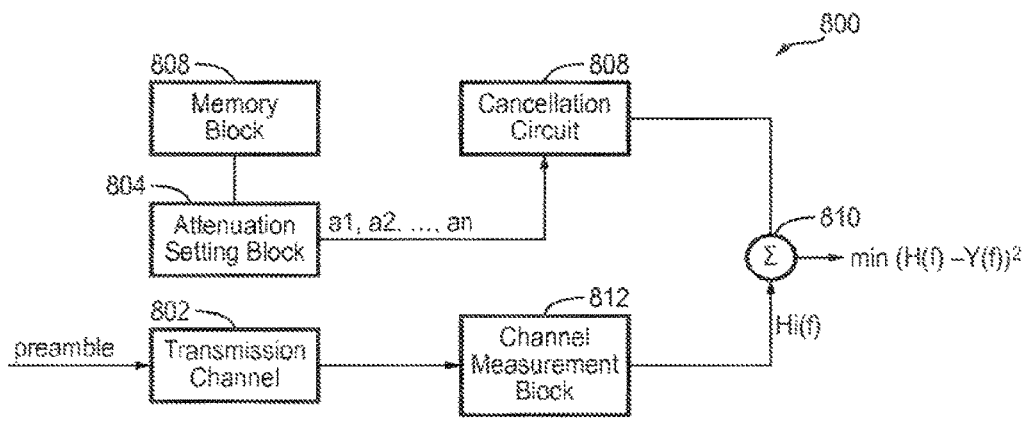
FIG. 8 is an exemplary block diagram of an analog self-interference cancellation circuit, in accordance with one embodiment of the present invention.

FIG. 8 is a simplified block diagram of an analog self-interference cancellation circuit 800, in accordance with one embodiment of the present invention. Circuit 800 is shown as including, in part, an analog cancellation circuit 808, a transmission channel 802, attenuation setting block 804, a combiner 810, a memory 806 storing the frequency response associated with each attenuation value of the variable attenuators disposed in cancellation circuit 808 and controlled by attenuation setting block 804, and a channel measurement block 812. Transmission channel 802 is configured to enable the measurement of the frequency response of the channel H(f) by transmitting a training signal (e.g., preamble).

In one embodiment, channel measurement block 812 may include an FFT engine for generating the frequency response of the transmitted preamble signal. As described above, the frequency response H(f) can be represented in the form of a matrix A having M rows and N columns, wherein M is the number of the delay paths of cancellation circuit 808, and N is the number of columns each being a frequency response for attenuations selected for the attenuators disposed in cancellation circuit 808 and in accordance with the values stored in memory 806. Based on matrix A, attenuation setting block 804 selects attenuation values from the memory for the various delay paths (attenuators) so that the difference at the output of subtractor 810 between the signal received from cancellation circuit 808 and transmission channel 802 is at a minimum value. In one embodiment, a processor/computer may be configured to perform the operations of and thus be used in place of both attenuation setting block 804 and channel measurement block 812.

Figure 9:
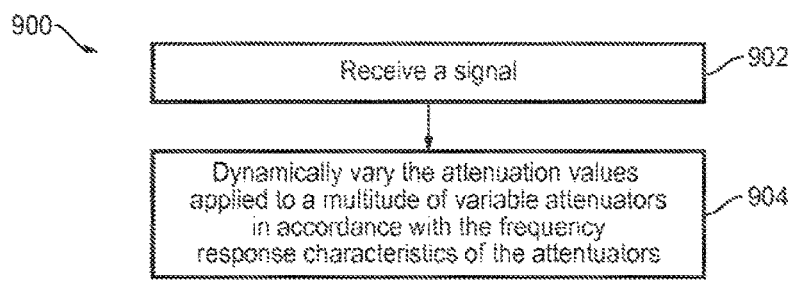
FIG. 9 is an exemplary flowchart for removing, via analog signals, a portion of the self-interference signal present in a signal received via a wireless communication system, in accordance with one embodiment of the present invention.

FIG. 9 is a flowchart 900 for removing, via in part analog signals, a portion of the self-interference signal present in a signal received via a wireless communication system, in accordance with one embodiment of the present invention. The wireless communication system includes a multitude of variable attenuators. At 902, the signal is received. At 904, the attenuation values applied to the variable attenuators are dynamically varied, in accordance with the frequency response characteristics of the attenuators to remove the portion of the self-interference signal from the received signal.

Digital Self-Interference Cancellation

Referring to FIG. 3, digital cancellation circuit 360 is to adapted to remove residual self-interference signal that may still be present at the output of ADC 338. For example, assume that the self-interference signal present in signal 384 has a magnitude of 130 dB, 60 dB of which is removed by analog cancellation circuit 350. Much of the remaining self-interference signal is removed by digital cancellation circuit 360 which is configured to remove both the linear and nonlinear components of the self-interference signal in a digital domain, as described further below. In one embodiment, digital cancellation of both linear and nonlinear components of the self-interference signal is performed by a processor/computer.

Cancellation of Linear Components

Linear components of the self-interference signal may be caused by, for example, the circulator, as well as any delayed reflections of the transmitted signal from the environment. The reflections may be delayed and attenuated by different unknown amounts.

In accordance with one aspect of the present invention, a portion of the self-interference is canceled in the digital domain as a linear and non-causal function of the transmitted signal. Since the previously transmitted packets as well as packets that have not yet been transmitted but are in the pipeline for transmission are both known, the non-causality of the model poses no difficulty in estimating a component of the self-interference signal. Accordingly, the received sample y[n] may at any instant be modeled as a linear combination of up to k samples of the known transmitted signal x[n] before and after the instant n. The parameter k is empirically chosen and is a function of the amount of memory in the channel. So y[n] may be written as shown in following:

$$y[n]=x[n-k]h[k]+x[n-k+1][h]k-1]+ \ldots +x[n+k-1]h[-k+1]+w[n] \quad (6)$$

where h[k], h[k−1], . . . , h[k+1] represent the attenuation levels of the transmitted signal, and w[n] is the receiver noise floor.

The coefficients h[n] may be estimated by using packet preambles that are widely used in most wireless transmissions. For example, the WiFi standard uses a preamble of two known OFDM symbols at the start of the packet. Assume the samples representing the preamble are represented by $x_{pr}[n]$. Assume further that the receive samples corresponding to the preamble are represented by y[0], . . . , y[n]. The above channel equations may then be written specifically for the preamble as:

$$y=Ah+w \quad (7)$$

where A represents Toeplitz matrix of $x_{pr}[n]$:

$$A = \begin{pmatrix} x_{pr}(-k) & \ldots & x_{pr}(0) & \ldots & x_{pr}(k-1) \\ x_{pr}(1-k) & x_{pr}(-k) & \ldots & \ldots & \ldots \\ x_{pr}(2-k) & x_{pr}(1-k) & x_{pr}(-k) & \ldots & \ldots \\ x_{pr}(n-k) & \ldots & x_{pr}(n) & \ldots & x_{pr}(n+k-1) \end{pmatrix}$$

The linear components of the cancellation signals may thus be obtained by finding a maximum likelihood estimate of the vector h to achieve the following:

$$\text{mininize} \|y-Ah\|_2^2 + \lambda^* \|h\|_2^2 \quad (8)$$

Since the values of the preamble samples are known, matrix A is also known in advance and may be pre-computed. Parameter λ represents the regularization parameter; it is proportional to the number of preamble samples and inversely proportional to the number of taps or weights estimated of the tapped transmitted signal. Vector h may be computed from the following expression:

$$h = \frac{(A^C A + \lambda *1)^{-1} A^C}{\left[a_1^\dagger(\lambda) a_2^\dagger(\lambda) \ldots a_{Npre}^\dagger(\lambda)\right]} \cdot y \quad (9)$$

where $A^C$ is the complex matrix of A, and I is the identity matrix. Since A and λ are known, Expression (9) can be pre-computed to determine vector h.

Vector h may also be computed by multiplying the i th received sample of the preamble $y_i$, which arrive serially, with $\alpha_i^\dagger(\lambda)$ which is the i th column of matrix $(A^C A + \lambda *1)^{-1} A^C$, in accordance with the following expression:

$$h = \Sigma_{i=0}^{Npre}(y_i \alpha_i^\dagger(\lambda)) \quad (10)$$

Thus, the estimation algorithm computes the linear distortions that the transmitted main signal experiences for every packet and dynamically adapts to it. Vector h is used as shown in expression (6) above to determine the linear components of the interference signal received by, for example, combiner 340 shown in FIG. 3.

Cancellation of Nonlinear Components

To further cancel the self-interference signal, in accordance with one embodiment of the present invention, a nonlinear function generated the Taylor series expansion is used. Accordingly, the signal being transmitted is defined as shown below:

$$y(t) = \sum_m a_m x_p(t)^m \quad (11)$$

where $x_p(t)$ is the ideal pass-band analog signal for the digital representation of known signal x(n).

Since only odd order terms (e.g., the terms containing $x_p(t)$, $x_p(t)^3$, $x_p(t)^5$, . . . ), have non-zero energy in the frequency band of interest, the even order terms may be safely ignored. The first term $x_p(t)$ is estimated and canceled using the algorithm described above. The above model may be further reduced and defined in the digital baseband domain as follows:

$$y(n)=\Sigma_m \in \text{odd terms}, n=-k, \ldots, k x(n)(|x(n)|)^{m-*}h_m(n) \quad (12)$$

where k is the number of samples in the past and future which significantly influence the value of the signal at instant n, and $h_m[n]$ is the weight associated with the term having order m and needs to be estimated, as described further below, to perform nonlinear cancellation.

To estimate $h_m[n]$, the pre-existing preambles such as the WiFi preamble or LTE training symbols may be used, as described above. Assuming a sampling rate of 160 MHz, a WiFi preamble includes a total of 1280 digital samples at the Nyquist sampling rate. However, variables $h_m(n)$ is a function of 2k (e.g., k samples of the past transmit signal and k samples of the future signal to be transmitted), and the highest value of in that exhibits strength greater than the receiver noise floor.

A simple model based on the 1, 3, 5, 7, 9, 11th order terms and which uses up to 128 samples (128 is suggested by the WiFi standard and is equal to the length of the WiFi OFDM cyclic prefix) from both the future and the past at any instant would require the estimation of 128*2*6=1536 variables using 1280 equations. The number of samples required is a function of the amount of multipath. As is known, the higher the multipath, the higher should be the number of samples in the past and future used in the calculation. A system of 1280 equations with 1536 variable is an under-determined system and solving it would increase the noise floor significantly.

Because many of the higher order terms have relatively less power than the lower order terms (the $7^{th}$ order term has lower power than the $5^{th}$ order term which, in turn) has lower power than the $3^{rd}$ order term, in accordance with one aspect of the present invention, many of the higher order terms are set to zero. In general, higher order terms have weaker strength relative to the main signal, and consequently, their multipath components also decay quickly below the receiver noise floor. In other words, far fewer than 128 samples from the past and future impact the value of the self-interference harmonic component at any given instant.

In accordance with one aspect of the present invention, for indoor WiFi systems, across all nonlinear higher order terms, a total of 224 variables, which may be easily accomplished using the WiFi preamble, are empirically shown to be required for nonlinear estimation. The method used for estimating the coefficients is similar to the one described above in connection with the linear digital cancellation step described above with matrix A defined as below:

$$\begin{pmatrix} x_{pr}(-k) & \ldots & x_{pr}(k-1) & x_{pr}(-k) \cdot |x_{pr}(-k)|^2 & \ldots & x_{pr}(k-1) \cdot |x_{pr}(k-1)|^{10} \\ x_{pr}(1-k) & \ldots & x_{pr}(k) & x_{pr}(1-k) \cdot |x_{pr}(1-k)|^2 & \ldots & x_{pr}(k) \cdot |x_{pr}(k)|^{10} \end{pmatrix}$$

Figure 10:
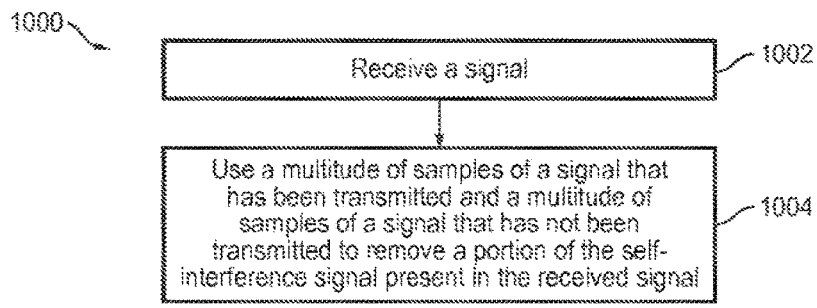
FIG. 10 is an exemplary flowchart for removing, via digital signals, a portion of the self-interference signal present in a signal received via a wireless communication system, in accordance with one embodiment of the present invention.

FIG. 10 is a flowchart 1000 for removing, via digital signals, a portion of the self-interference signal present in signal received via a wireless communication system, in accordance with one embodiment of the present invention. At 1002, the signal is received. At 1004 a multitude of samples of a signal that has been transmitted and a multitude of samples of a signal that has not been transmitted are used to remove the portion of the self-interference signal from the received signal.

Gain Phase Offset Cancellation

Radio transmitters have phase imbalance which is caused, in part, by inaccurate phase shift between the I and Q channels (ideally it should be 90 degrees but it is hard to achieve in practice). Gain imbalance occurs due to inaccurate gains applied by DAC, prior to upconversion. However, assuming a known ideal signal is transmitted, $x_{kn}(n)=x_I(n)+jx_Q(n)$. In practice, a non-ideal $x_a(n)=x_I(n)+jae^{j\phi}x_Q(n)$ is transmitted, where a is gain imbalance and $\phi$ is phase imbalance. Mathematically $x_a(n)$ may be written as follows:

$$x_a(n) = \frac{x_{kn}(n) + x_{kn}^C(n)}{2} + jae^{j\phi}\frac{x_{kn}(n) - x_{kn}^C(n)}{2} \quad (13)$$

$$x_a(n) = x_{kn}(n) + bx_{kn}^C(n) \quad (14)$$

where $x_{kn}(n)$ is a known transmitted ideal signal, "b" represents the gain and phase imbalance, and $x_{kn}^C(n)$ is the complex of $x_{kn}$.

In general, there is some time offset as well which can be modeled as channel. This time offset is taken into account as follows:

$$x_a(n)x_{kn}(n)+bh_d(n)*x_{kn}^C(n) \quad (15)$$

where $h_d(n)$ compensates for the delay mismatch.

Some embodiments of the present invention provide the following algorithm for the estimation of $bh_d(n)$ or b which can just be absorbed into $h_d(n)$, so then it can compensate for $h_d(n)$ in the entire cancellation model (linear and nonlinear cancellation) according to an embodiment. This effect can be taken care of by first estimating the channel for linear and nonlinear components, then solve a simple estimation problem for $h_d(n)$ to maximize the cancellation. First, a large model is made, channels corresponding to $x_{kn}(n)$ and $x_{kn}^C(n)$ are estimated, then $h_d(n)$ is fitted as best as possible. This model is then iteratively repeated to refine the estimate of $h_d(n)$.

However, for this technique to work, it requires that $X(f) \neq X^*(-f)$, since otherwise this system of equation would degenerate. However, this distortion is a property of the radio and does not change with temperature and other variations. In one embodiment, the transmitter may send out a training sequence X(f) that is not equal to its complex conjugate for calibrating the gain and phase imbalance. A one-time calibration of the radio is performed by designing a transmission that satisfies $X(f) \neq X^*(-f)$ and measuring b. Once done, this gain and phase imbalance is then used in the digital cancellation algorithm.

LO Leakage Cancellation

An embodiment of the present invention also provides cancellation of the LO leakage, which is a constant added before the power amplifier, by mixer and other components. This can be modeled in the same manner as gain phase offset estimate process described above.

Modeling Memory in Cancellation

A final challenge is that nonlinearities have memory, that is the value of the nonlinear distortion at any instant depends on the signal value at a previous instant. The key reason is the low noise amplifier (LNA) of the receiver. The LNA may amplify very weak radio frequency signals with a fixed or variable gain and generate an amplified received signal. The LNA faces high power interference components with different delays. These components also include contributions from the analog cancellation board. With these distortions the received signal with memory can be modeled as follows:

$$y_r(n) = \sum_{m} \sum_{i_1,\ldots,i_m} x(n-i_1)x(n-i_2)\ldots x(n-i_m)h_m(i_1,\ldots,i_m) \quad (16)$$

where $y_r(n)$ is residual after canceling all other linear and nonlinear components, m represents the memory depth (e.g., the multi-paths), and K represents indexes from the intermediate variables (e.g., $i_2, i_3, \ldots, i_{m-1}$ or $x(n-i_3), \ldots, x(n-i_{m-1})$). A naive approach to estimating these coefficients for all memory terms would require a large set of variables (exponential complexity with the memory term being the exponentiation factor). Estimating all of them would be prohibitively expensive and not feasible with a few training symbols.

Embodiments of the present invention provide a search technique that exponentially reduces the number of variables that need to be estimated. In an embodiment, the positions $i_1, \ldots, i_m$ are determined by strong multi-paths and the taps (delays) from the cancellation board itself. These are typically located $i_1, i_2$ $$i_m \in \left(-\frac{K}{2}, \frac{K}{2}\right)$$

in digital domain. The number of positions K can be inferred, it includes learning for N taps of cancellation boards and strong multi-paths (R components), these strong multi-paths (a total of 5) can be learned from the linear channel response. So for a typical case, these would be a small number (K=N+R, the number of taps N in the cancellation circuit and the significant multi-paths R from the environment). In an embodiment, there are 8 taps and 5 channel responses so that K=13. However, learning even for m=3 and K=13 positions, e.g., $i_1, i_2, i_3 \in (-6, 6)$, requires estimating $13^3$ coefficients (h), and for m=5, 7, 9 would increase exponentially. Further, whenever analog cancellation is returned these need to be re-learned.

An embodiment of the present invention solves this problem by smart iterative estimation to trim down the computation complexity for $5^{th}$, $7^{th}$ and higher order. Assuming there are 13 strong paths, so 13 digital samples are needed for them digital samples from (−6, 6). Now, Equation (16) shows that their inter-products are at the locations where the $h(i_1, i_2, \ldots, i_m)$ is significant. So this chunk is selected to estimate the $h(i_1, i_2, \ldots, i_m)$. This takes $O(13^3*W)$ computation every-time a sphere around an inter-mod product in estimation is considered, then find which of them are significant. Once the model for m=3 has been learned, then in m=5 becomes simpler. The reason is that components which have significant contribution in m=3 create significant contributions for m=5 as well. For example, if $h(i_1, i_2, i_3)$ is significant, then $h(i_1, i_2, i_3, i_4, i_5)$ will likely be significant, where $(i_4, i_5) \in (-6,6)$ predefined locations. Thus for every step the added complexity is $O(13^2*W)$. The above search will be conducted until m=7. This entire process takes 4-5 μsec. This location finding has to conducted every time analog cancellation is tuned. Once locations are known, it is taken into account in the channel matrix and then computed in O(W) time. For commodity WiFi radios, in total 132 coefficients at the 40 MHz sampling rate for a bandwidth of 20 MHz have to be estimated, which can be done on a per packet basis using the preamble.

Interference Cancellation in MIMO Systems

A full duplex M×M MIMO radio may have M antennas corresponding to M spatial signal streams operating simultaneously in opposite directions in the same band. The full duplex M×M MIMO radio theoretically achieves twice the throughput of a half-duplex M×M MIMO radio. However, no practical implementation of such a system exists in the art.

As described earlier, self-interference in single input single output (SISO) full duplex system can be eliminated up to the noise floor according to one embodiment, which can achieve the theoretical doubling of throughput. A MIMO radio may be viewed as a collection of M single antenna SISO radios. In one embodiment, a SISO full duplex radio and its associated self-interference cancellation circuit as illustrated in FIG. 3 may be replicated for each antenna in a M×M MIMO full duplex radio. However, cross-talk interference may still need to be eliminated if single antenna SISO radios are replicated M times to build a M×M MIMO full duplex radio.

It should be noted that when a MIMO radio transmits, the transmission from each antenna propagates to the other antennas (e.g., and receive chains associated with them) and causes a large amount of cross-talk interference on the other receive chains. Since MIMO antennas are closely spaced due to size constraints, cross-talk could be very strong. In one example, cross-talk interference may be almost 80 dB stronger than a signal that is being received on a receive chain. Consequently, with cancellation circuits and algorithms that cancel a radio chain's own self-interference, there may still exist strong cross-talk that saturate the receive chain.

In one embodiment, a separate cancellation circuit may be used to cancel cross-talk interference from each transmit antenna in the system. If there are M antennas, a total of $M^2$ cancellation circuits and DSP-based cancellation algorithms may be used in the system to cancel self-interference and cross-talk interference, as illustrated in FIG. 11.

Figure 11:
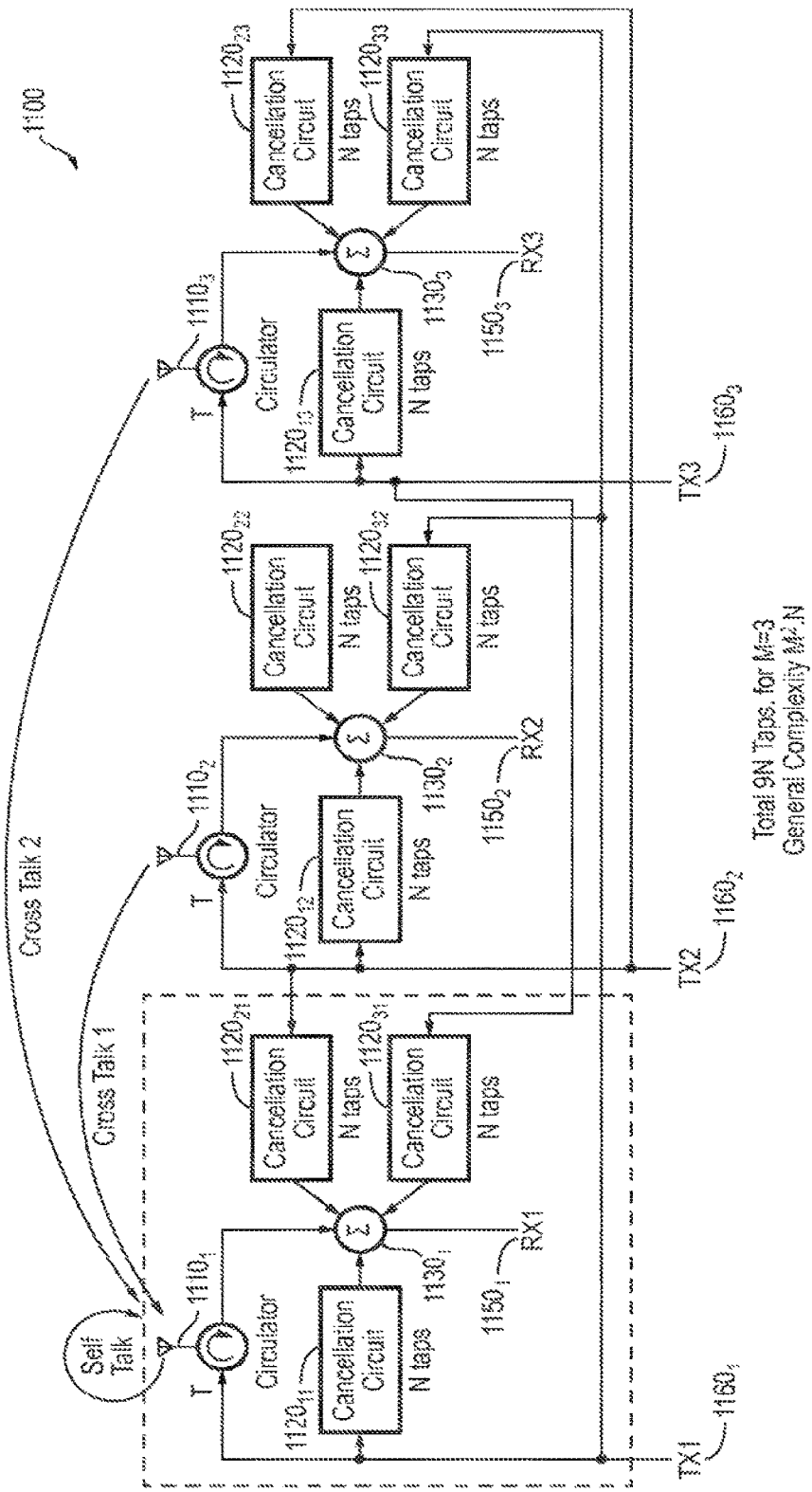
FIG. 11 is an exemplary block diagram of a MIMO interference cancellation circuit, in accordance with one embodiment of the present invention.

FIG. 11 illustrates an exemplary 3×3 full duplex MIMO architecture, in accordance with certain embodiments of the present disclosure. As illustrated, the 3×3 full duplex MIMO architecture has three antennas $1110_1$, $1110_2$ and $1110_3$ for transmitting and receiving signals. The first antenna $1110_1$ is used to transmit the first transmit signal TX1 and receive the first composite receive signal 1115. The first composite receive signal includes a desired receive signal plus self-interference caused by transmissions from antenna $1110_1$, and/or cross-talk interference caused by transmissions from other antennas (e.g., $1110_2$ and/or $1110_3$) In order to cancel interference caused by each of the transmit signals on the signals received on each antenna, a SISO cancellation circuit as shown in FIG. 3 may be used.

In one embodiment, the SISO cancellation circuit may be replicated nine times to cancel self-interference and cross-talk interference on each received signal. As an example, the first receive chain (RX1 $1150_1$) is coupled with cancellation circuits $1120_{11}$, $1120_{21}$ and $1120_{31}$. Each of the cancellation circuits $1120_{ij}$(i=1, 2, 3, and j=1, 2, 3) may include an analog cancellation circuit 350 and/or a digital cancellation circuit 360, or any other elements as shown in FIG. 3. Cancellation circuit $1120_{11}$ receives a copy of a first transmit signal TX1 and generates a signal to cancel a self-interference signal caused by transmission of the first transmit signal TX1 from first antenna $1110_1$. Cancellation circuit $1120_{21}$ receives a copy of a second transmit signal TX2 and generates a signal to cancel cross-talk interference on the first received signal 1115 caused by transmission of the second transmit signal TX2 from second antenna $1110_2$. Similarly, cancellation circuit $1120_{31}$ receives a copy of third transmit signal TX3 and generates a signal to cancel cross-talk interference on the first received signal caused by transmission of third transmit signal TX3 from third antenna $1110_3$.

Similarly, the second receive chain (RX2 $1150_2$) is coupled with cancellation circuits $1120_{12}$, $1120_{22}$ and $1120_{32}$. Cancellation circuits $1120_{12}$, $1120_{22}$ and $1120_{32}$ generate signals to cancel interference on the second receive signal by transmission of TX1, TX2 and TX3, respectively. And cancellation circuits $1120_{13}$, $1120_{23}$ and $1120_{33}$ generate signals to cancel interference on the third receive signal by transmission of TX', TX2 and TX3, respectively.

Combiners $1130_1$, $1130_2$ and $1130_3$ combine a copy of their corresponding composite receive signal with outputs of the cancellation circuits associated with them to eliminate/reduce interference on the received signals. For example, combiner $1130_1$ combines the outputs of cancellation circuits $1120_{11}$, $1120_{21}$ and $1120^{31}$ with the first composite receive signal 1115 to generate signal RX1 $1150_1$. In one embodiment, each of the cancellation circuits $1120_{ij}$ use N filter taps, which results in 9 N taps in the architecture shown in FIG. 11. In a general case, for an M×M MIMO case, $M^2$×N filter taps may be used. It should be noted that complexity of this design may grow quadratically with increasing the number of antennas.

Certain embodiments disclose an efficient MIMO cancellation technique for full duplex MIMO that is scalable for larger number of antennas. The MIMO cancellation technique utilizes a cascaded filter structure to cancel self-interference and cross-talk interference. Specifically, one embodiment takes advantage of the correlation between cross-talk interference and self-interference in MIMO, since they share a similar environment. In one example, the cross-talk and self-interference share a similar set of multi-path reflections and attenuation profiles in the channel. Furthermore, it should be noted that cross-talk across different transmit/receive chains is smaller than chain's own self-interference because of physical antenna separation.

Reducing Complexity: The Cascade Filter Structure

Since co-located MIMO antennas share a similar environment, the transfer function that transforms the cross-talk signal at a receive chain is highly correlated with the transfer function that the chain's own self-interference undergoes. This is because the near-field environment around a radio looks essentially the same to neighboring antennas, since they share the same reflectors in the environment. In addition, the distance to these reflectors is almost the same from closely-spaced antennas. The only difference is the additional delay experienced by the cross-talk signal compared to the chain's own self-interference. Note that this does not mean that MIMO self-interference and cross-talk channels are completely correlated. In fact, each of the self-interference and the cross talk channels will still have independent phases that arise from the slightly different delays experienced by self-interference and cross-talk signals at RF frequencies. However, the amplitudes of the multi-path reflections for self-interference and cross-talk from the same reflector tend to be nearly the same. This may be because the distance to the reflector is almost equal from closely-spaced MIMO antennas.

The above insight can be mathematically modeled as a cascade of transfer functions, as follows:

$$H_{ct}(f) = H_c(f) H_i(f) \qquad (17)$$

where $H_{ct}(f)$ represents transfer function of the cross-talk interference, $H_i(f)$ represents transfer function of the chain's own self-interference and $H_c(f)$ represents the cascade transfer function. One observation is that $H_c(f)$ which is cascaded with $H_i(f)$ to result in the cross-talk transfer function $H_{ct}(f)$, is a simple transfer function. In one embodiment, $H_c(f)$ is a simple delay that corresponds to the fact that the two antennas are separated. It should be noted that cross-talk signal experiences slightly higher delay compared to the self-interference.

Figure 12:
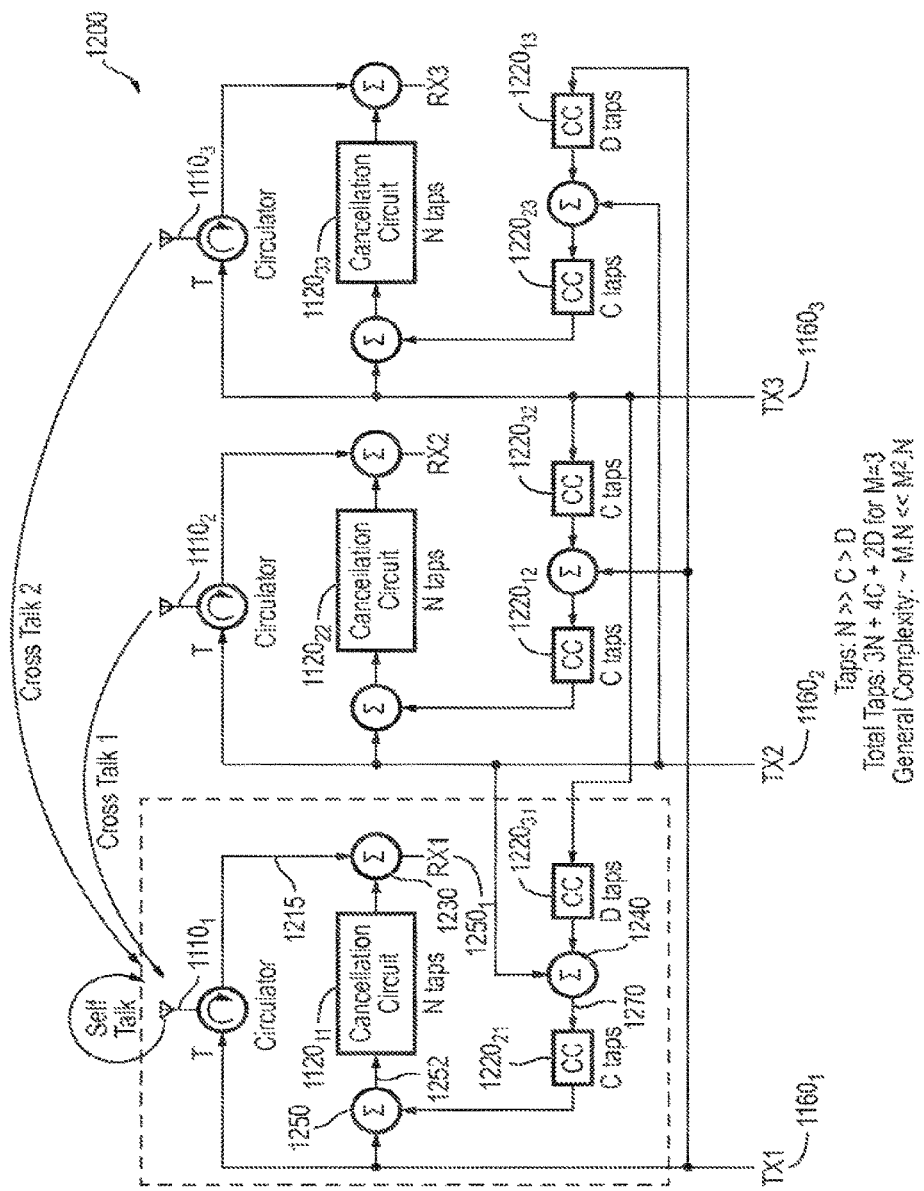
FIG. 12 is another exemplary block diagram of a MIMO interference cancellation circuit, in accordance with one embodiment of the present invention.

FIG. 12 illustrates an exemplary 3×3 full duplex MIMO radio using a cascaded filter architecture, in accordance with one embodiment of the present invention. Since the circuits and digital filters for the chain's own self-interference are modeling $H_i(f)$, the cascaded filter structure in FIG. 12 is essentially recreating the Eqn. (17). Therefore, the only additional complexity for cancelling cross talk interference would be from the circuits and filters that model the cascade transfer function $H_c(f)$.

As illustrated in FIG. 12, the 3×3 full duplex MIMO radio has three antennas $1110_1$, $1110_2$ and $1110_3$ for transmitting and receiving signals. The first antenna $1110_1$ is used to transmit the first transmit signal TX1 and receive the first composite receive signal. The first composite receive signal includes a desired receive signal plus self-interference caused by transmissions from antenna $1110_1$, and cross-talk interference caused by transmissions from other antennas (e.g., $1110_2$ and $1110_3$). In this example, similar to the architecture shown in FIG. 11, the self-interference in the first composite receive signal is cancelled using the cancellation circuit $1120_{11}$. However, the cross-talk interference caused by transmissions from the second antenna $1110_2$ on the first composite receive signal is cancelled by a cascaded filter structure including cancellation circuit $1220_{21}$ and cancellation circuit $1120_{11}$. As mentioned earlier, cancellation circuit $1220_{21}$ has significantly lower complexity than the cancellation circuit $1120_{11}$. In one example, cancellation circuit $1120_{11}$ has N filter taps, while cancellation circuit $1220_{21}$ has C filter taps, and N>>C.

Similarly, the cross-talk interference caused by transmissions from the third antenna $1110_3$ on the first composite receive signal is cancelled by another cascaded filter structure including cancellation circuit $1220_{31}$, cancellation circuit $1220_{21}$ and cancellation circuit $1120_{11}$. In this case, cancellation circuit $1220_{31}$ has significantly less complexity than the cancellation circuit $1120_{11}$. In one example, cancellation circuit $1120_{11}$ has N filter taps, cancellation circuit $1220_{21}$ has C filter taps, and cancellation circuit $1220_{31}$ has D filter taps and N>>C>D.

In the cascaded filter architecture, a copy of a third transmit signal TX3 is passed through cancellation circuit $1220_{31}$ before being combined with a copy of the second transmit signal by combiner 1240 to generate combined signal 1270. The combined signal 1270 passes through the cancellation circuit $1220_{21}$ before being combined with a copy of the first transmit signal TX1 using combiner 1250 to generate signal 1252. Cancellation circuit $1120_{11}$ receives a copy of the signal 1252 and generates a cancellation signal that is combined with the first composite receive signal 1215 (by combiner 1230) to generate signal RX1 $1250_1$. Signal RX1 has substantially less self-interference and/or cross-talk interference than the first composite receive signal 1215.

In general, each of the cancellation circuits $1220_{ij}$ (i=1, 2, 3, and j=1, 2, 3, i≠j) and $1120_{ii}$ (i=1, 2, 3) may include an analog cancellation circuit 350 as shown in FIG. 3 and/or digital cancellation circuit 360, or any other elements.

In one embodiment, the cascaded structure is designed to provide 65 dB of analog cancellation. For a typical three antenna MIMO WiFi radio with 12 cm separation between antennas (e.g., typical of access points), the antenna separation itself provides about 24 dB of isolation, so another 41 dB of cross-talk cancellation should be provided by analog cancellation. In this example, only four analog taps may be needed with the cascaded structure for canceling cross-talk at an adjacent antenna (e.g., in cancellation circuit $1220_{21}$) and only two taps, when canceling the interference from the farther out antenna (e.g., in cancellation circuit $1220_{31}$), as shown in FIG. 12.

Reducing complexity of the cancellation architectures results in reduction in size, cost and tuning time. Each additional filter tap increases size of the analog and digital cancellation circuits. In addition, tuning time to compute the weights for each of these taps also reduces linearly with smaller number of taps. It should be noted that tuning time can be viewed as overhead since during tuning the radio may not be used for communication.

In general, the amount of power that needs to be couple off from the transmit paths to power cancellation circuits depends linearly on the number of taps in the cancellation circuits. This is because a copy of the transmitted signal is passed through each tap. In addition, each tap is associated with some power loss. Thus reducing number of taps helps reduce TX power waste, which in turn translates to less battery consumption.

Figure 13:
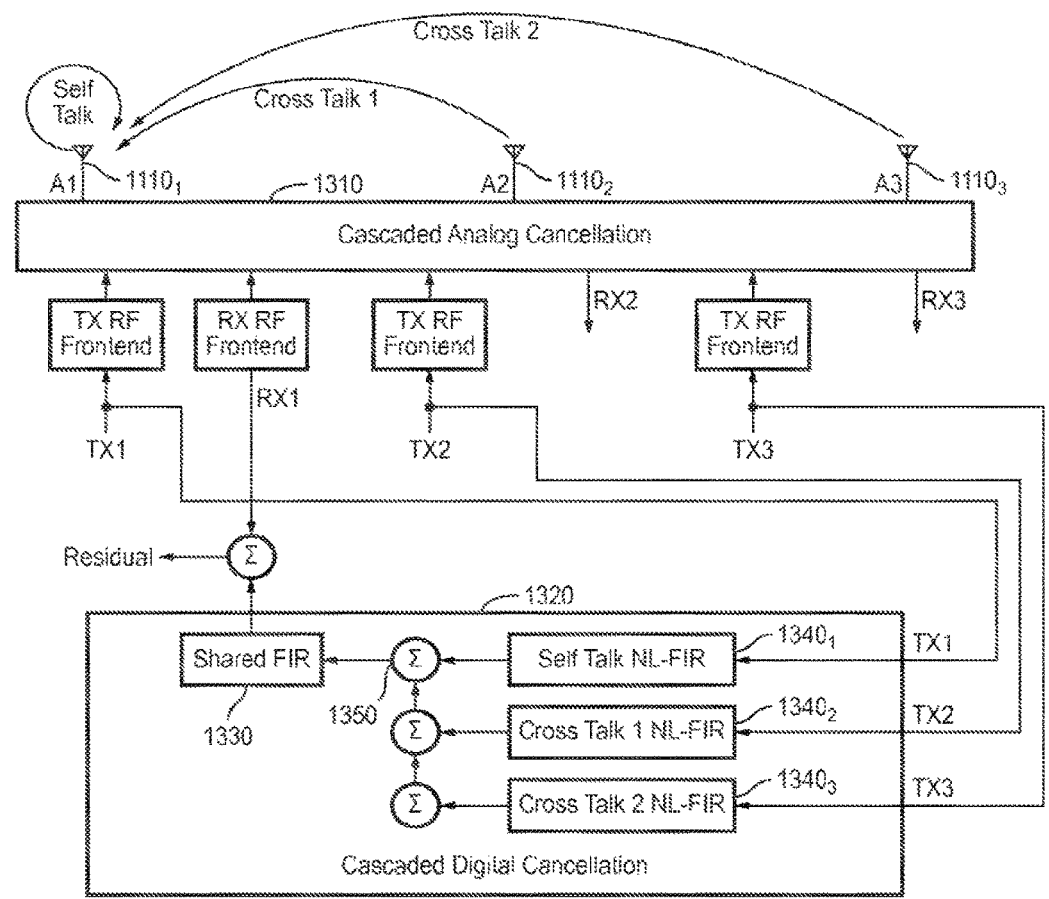
FIG. 13 illustrates an exemplary block diagram of a MIMO interference cancellation circuit including a cascaded digital cancellation, in accordance with one embodiment of the present invention.

FIG. 13 illustrates an exemplary block diagram of a MIMO interference cancellation circuit 1300, including a cascaded digital cancellation architecture 1320, in accordance with one embodiment of the present invention. In this figure, the cascaded digital cancellation architecture is shown for the first receiver chain. Similar cascaded digital cancellation can be applied to other receive chains. The cascaded analog cancellation 1310 is implemented as shown in FIG. 12.

As illustrated, the cascaded digital cancellation 1320 includes a shared FIR filter 1330 and non-linear finite impulse response filters $1340_1$, $1340_2$ and $1340_3$, each corresponding to one of the signal paths. For example, the non-linear finite impulse response filter $1340_1$ corresponds to the self-interference from the first transmitter TX1. Similarly, the non-linear finite impulse response filter $1340_2$ corresponds to the cross-talk interference from second transmitter TX2 and the non-linear finite impulse response filter $1340_3$ corresponds to the cross-talk interference from third transmitter TX3. The Shared FIR 1330 corresponds to the shared components of the self-interference and the cross-talk interference. Using the shared FIR 1330 brings significant saving of taps for overall MIMO cancellation. The non-linear finite impulse response filters $1340_1$, $1340_2$ and $1340_3$, recreate a digital copy of the unique components for the self-interference and cross-talk interference to be canceled at a receive chain.

Reducing Interference Residue: Joint Training

The goal of digital cancellation is to clean out any remaining residual self-interference. In general, digital cancellation works in two stages, a training phase and a cancellation phase. The training phase uses training symbols (e.g., the WiFi preamble), and the assumption is that there is no desired received signal from the other full duplex node. The training symbols are used to estimate the self-interference. The training self-interference symbol is represented by s as seen in FIG. 14A.

Figure 14A:
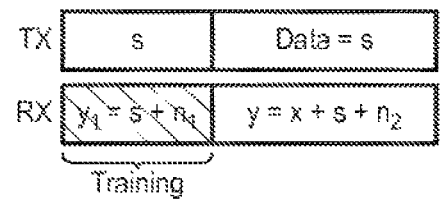
FIGS. 14A through 14C illustrate exemplary transmit and receive packets of a SISO full duplex system, a replication-based MIMO full duplex system, and a cascaded MIMO full duplex system, respectively, in accordance with embodiments of the present invention.
Figure 14B:
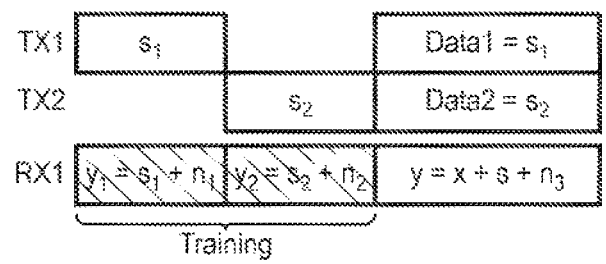
Figure 14C:
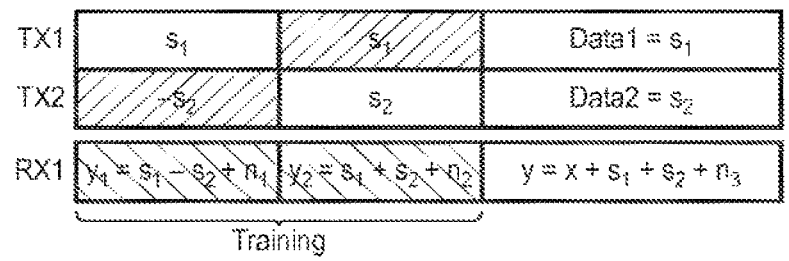

FIGS. 14A through 14C illustrate exemplary transmit and receive packets of a SISO full duplex system, a replication-based MIMO full duplex system and a cascaded MIMO full duplex system respectively, in accordance with embodiments of the present invention. As illustrated in FIG. 14A, in a SISO full duplex system, the transmission packet includes a training symbol s and data. At the receiver, the receiver receives a copy of the training symbol s plus noise, and estimates the channel based on the received signal.

The self-interference symbol is being received after transmission from the same radio (for simplicity assume there is no distortion from the channel), and the receiver adds its own noise $n_1$ (e.g., with variance $\sigma^2$) to the received signal. In one example, the receiver noise comes from effects such as quantization in the ADC. Hence the received signal $y_1$ can be written as follows:

$$y_1 = s + n_1 \tag{18}$$

The best estimate of the self-interference signal s in this case is $y_1$. However, the estimate $\hat{s}$ has some estimation error, which in this case is the power of the receiver noise as follows:

$$\hat{s} = y_1, E((s-\hat{s})^2) = E(n_1^2) = \sigma^2. \tag{19}$$

In a simple case, a packet that is being transmitted and is acting as self-interference is considered to be the same as multiple training symbols repeated throughout the packet. To cancel this self-interference throughout the packet, the algorithm may subtract the above estimate from the overall received signal. If x is the actual desired received signal, the overall signal received is y, and the signal after cancellation, are given by:

$$y = x + s + n_3 \tag{20}$$

$$\underbrace{y - \hat{s}}_{cancellation} = x + \underbrace{s - \hat{s}}_{estimation\ error = \sigma^2} + \underbrace{n_3}_{RX\ noise}$$

The estimation error shows up as residual interference with variance of $\sigma^2$. In one example, the estimation error may be on the order of 1 db over the half-duplex noise floor. In one example, a design for MIMO that uses M replicas of the digital cancellation algorithm at each receive chain for the self-interference and the M-1 cross-talk interference signals may increase the estimation error roughly by a factor of M.

FIG. 14B illustrates a training symbol structure for a 2×2 MIMO transmission. As illustrated, two training symbols $s_1$ and $s_2$ are sent over two slots from the two different transmit chains. The algorithms at a particular receive chain use these symbols to estimate the self-interference and the cross-talk, and each of them will have their own estimation error. When these estimates are used for cancellation, the estimation errors add up, and the overall estimation error (or residual self-interference) at each receive chain is theoretically two times the SISO case. This can be shown using mathematical formulas, as follows. The estimates for the self-interference and cross-talk symbols are given by:

$$\hat{s}_1 = y_1, E((s_1 - \hat{s}_1)^2) = \sigma^2$$

$$\hat{s}_2 = y_2, E((s_2 - \hat{s}_2)^2) = \sigma^2 \tag{21}$$

When canceling to attempt to recover the desired received signal x, the estimation error can be calculated as follows:

$$y = X + s_1 + s_2 + n_3 \tag{22}$$

$$\underbrace{y - \hat{s}_1 - \hat{s}_2}_{cancellation} = X + \underbrace{s_1 - \hat{s}_1}_{\sigma^2} + \underbrace{s_2 - \hat{s}_2}_{\sigma^2} + \underbrace{n_3}_{RX\ noise}$$

In this example, the estimation error shows up as residual interference with variance of $2\times\sigma^2$, both self-interference and cross-talk estimation introduce $\sigma^2$ error. It can recursively be shown that for a general M antenna full duplex MIMO radio using the training symbols shown in FIG. 14B, the estimation error and consequently residual interference on each receive chain goes to $M\sigma^2$.

FIG. 14C illustrates a novel training symbol structure for a full duplex M×M MIMO radio, according to one embodiment. The novel training symbol structure and corresponding estimation algorithm reduce the estimation error for each interference component at each receiver chain elf-interference or cross-talk) to $\sigma^2/M$. The training symbols are redesigned to reduce the estimation error. Specifically, instead of sending training symbols from each of the transmit chains separately in consecutive time slots, a combination of some or all of them is transmitted from each transmitter in parallel. The idea is to leverage the fact that there are two transmitters that could be used to transmit training information jointly and thereby improve accuracy. There is no need to treat each transmitter separately. Certain embodiments design training symbols for the two transmitters jointly such that each symbol can be estimated as a linear combination of the received transmissions.

As seen in FIG. 14C, the training symbols are transmitted by transmit chain 1 and transmit chain 2 simultaneously. In time slot 1, transmitters 1 and 2 transmit $s_1$ and $s_2$, respectively. And in time slot 2, transmitters 1 and 2 transmit $s_1$ and $-s_2$, respectively. Receiver 1, receives the combined symbols in time-slot 1 and time-slot 2, $y_1$ and $y_2$. Thus:

$$y_1 = s_1 + s_2 + n_1, \; y_2 = s_1 - s_2 + n_2 \tag{23}$$

In one example, it is assumed that the rest of the transmissions from the two chains are repetitions of the same symbols $s_1$ and $s_2$, respectively (e.g., only for ease of explanation). The data symbols $s_1$ and $s_2$ should be estimated using the two training signals $y_1$ and $y_2$. Therefore, the estimates are given by:

$$\hat{s}_1 = \frac{y_1 + y_2}{2}, \; E(s_1 - \hat{s}_1)^2 = E\left(\left(\frac{n_1 + n_2}{2}\right)^2\right) = \frac{\sigma^2}{2} \tag{24}$$

$$\hat{s}_2 = \frac{y_1 - y_2}{2}, \; E(s_2 - \hat{s}_2)^2 = E\left(\left(\frac{n_1 - n_2}{2}\right)^2\right) = \frac{\sigma^2}{2}$$

The error in each of these estimates (self-interference and cross-talk) is equal to $\sigma_2/2$. If these estimates are used for cancellation, the following equation results:

$$y = x + s_1 + s_2 + n_3 \tag{25}$$

$$\underbrace{y - \hat{s}_1 - \hat{s}_2}_{cancellation} = x + \underbrace{s_1 - \hat{s}_1}_{\frac{\sigma^2}{2}} + \underbrace{s_2 - \hat{s}_2}_{\frac{\sigma^2}{2}} + \underbrace{n_3}_{RX\,noise}$$

Receive Noise

In this example, the residual interference is equal to $\sigma^2$. Further, it can be shown by recursion that this residual noise is the same as the residual interference in a SISO design. Therefore, using the new training symbols, residual interference does not increase with the number of MIMO chains as the number of antennas increases. The training symbols for the general M antenna case may be designed such that appropriate linear combinations of the received symbols at any chain can be used to estimate the self-interference and cross-talk symbols individually. In this example, these training symbols are designed such that linear combinations in multiple time slots at a receive chain do not degenerate.

Robust MIMO Interference Cancellation

Interference cancellation should be robust to enable consistent full duplex operation in the face of frequent changes in transmission channel conditions. To accomplish this, both analog and digital cancellation circuits may continuously tune their filter taps to maintain cancellation. The main bottleneck is tuning analog cancellation, since digital cancellation can be tuned on a per-packet basis in software. Tuning analog circuits may need measuring the residual noise in digital and then sending control signals to analog components, which is relatively slow. Minimizing the amount of time spent to tune the cancellation circuits is preferred, since during the time spent tuning packets may not be received.

As described earlier, in one example, the SISO full duplex design tunes a single analog cancellation circuit in around a millisecond. However, if the same algorithm is replicated for all the self-interference components, $M^2$ ms may be used to tune a M antenna full duplex MIMO radio (e.g. 9 ms for a 3 antenna full duplex). Such a high overhead may not be desirable for moderately mobile environments where the channel changes on average every 60 ms (e.g., WiFi hotspots).

One embodiment presents a novel tuning technique that reduces tuning time by three orders of magnitude. In one example, the disclosed tuning algorithm tunes the MIMO architecture in 8 ms. Note that this algorithm may also be used to tune SISO cancellation architecture. In this technique, the cancellation circuit is modeled as a filter whose response is tuned to match (as closely as possible) the frequency response of the self-interference channel. Frequency response of the cancellation circuit is estimated for different combinations of filter tap values. The pre-calculated response is represented in a matrix A, whose each column is the frequency response of the analog cancellation circuit for a particular value of the filter tap at K different frequencies in the band of interest (e.g., K=128 for a 20 MHz bandwidth in an example prototype for WiFi).

Assuming H(f) is the frequency response of the self-interference channel in the frequency domain (e.g., the channel introduced by the antenna, circulator and any strong environmental reflections), the analog cancellation tuning problem can be written as follows:

$$\min_{x} \|H - Ax\|^2$$

where, H is the column consisting of H(f) at different frequencies, and x represents a binary indicator vector for selecting the corresponding filter tap values.

The efficacy of the tuning that results from the above problem depends on the accuracy in the measurement of H(f). We can measure H(f) using the preamble of the received interference signal y(t) (e.g., the first two OFDM symbols of a transmitted WiFi packet which are known preamble symbols). The challenge is measuring the frequency response of the interference channel accurately. The accuracy is limited by the linearity of the transmit-receive chain, which is, for example, 30 dB. Therefore, any initial measurement can only have an accuracy of 30 dB. The main reason is that the transceiver produces non-linearities which act as noise to the channel estimation algorithm. In other words, the received interference signal y(t) has non-linearities that are, in one example, only 30 dB below the main linear signal component. Certain embodiments disclose a technique to accurately measure this channel quickly in the presence of non-linearities and tune analog cancellation circuits.

Tuning Cascaded Filter Structure:

As described earlier a SISO cancellation circuit may be tuned in two OFDM symbols to achieve, in one example, 60 dB of cancellation. In one embodiment, a similar tuning algorithm may be used to tune a M×M MIMO cancellation circuit with cascaded filter structure. However, it should be noted that by increasing the number of antennas, and the number of cascaded filter structures, parameter space grows rapidly, which may result in a NP hard problem. Certain embodiments disclose a method to approximate the overall combinatorial problem via two reduced complexity problems which can be solved using the same technique as the SISO method presented above.

The algorithm is described in the context of tuning the cancellation circuits at receiver 1 for self-interference and cross-talk in a 2 antenna MIMO radio. However, the same algorithm may be used in a general M×M MIMO system without departing from the teachings of the present disclosure. $H_{11}$ represents the self-interference channel response and $H_{12}$ represents the cross-talk channel response. The general tuning problem can be stated as follows:

$$\underset{x_1, x_2}{\text{minimize}} \quad t \qquad (26)$$
$$\text{subject to} \quad \text{norm}(H_{11} - A_1 x_1) \le t$$
$$\text{norm}(H_{12} - (A_1 x_1) \odot (A_2 x_2)) \le t$$

where, $\odot$ represents the element-wise multiplication of the column, and t represents the analog cancellation achieved, and $A_1$ is the response of the self-interference cancellation circuit with N taps in FIG. 12 and $A_2$ is the response of the cascade cancellation circuit with C taps. The second constraint in Eqn. (26) renders the problem irreducible to a convex solvable form, and in fact the column-wise multiplication of the indicator variable vectors explodes the problem space and makes it a NP hard combinatorial problem.

One embodiment approximates the problem stated in Eqn. (26) practically. Since the first constraint in Eqn. (26) is trying to find $A_1 x_1 = H_{11}$, we can approximate $A_1 x_1$ in the second constraint with $H_{11}$ which is known ($H_{11}$ is measured). This is of course an approximation, but it suffices to solve for $x_2$ using this substitution since the same cascaded channel response structure is emulated in the architecture illustrated in FIG. 12. Thus, in one embodiment, instead of a cascade of unknown variables, the new problem to solve can be written as follows:

$$\underset{x_1, x_2}{\text{minimize}} \quad t \qquad (34)$$
$$\text{subject to} \quad \text{norm}(H_{11} - A_1 x_1) \le t$$
$$\text{norm}(H_{12} - H_{11} \odot (A_2 x_2)) \le t$$

This new problem is no longer a combinatorial problem. This can be reduced to an integer program, which can be solved using randomized rounding in fraction of micro seconds practically. Thus, the substitution technique reduces the non-tractable combinatorial problem into a tractable problem, whose solution can be found using the techniques described above. The tuning time for each MIMO chain may still be equal to two OFDM symbols, and the overall tuning time for the MIMO radio therefore scales linearly with M, the number of chains.

Figure 15:
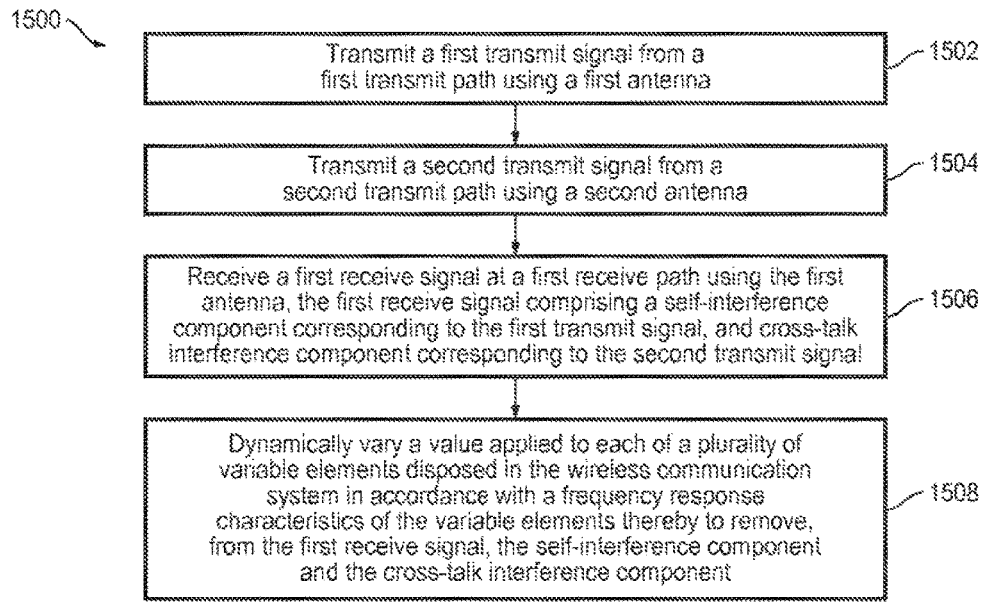
FIG. 15 illustrates example operations that may be performed to cancel interference in a MIMO system, in accordance with an embodiment of the present disclosure.

FIG. 15 illustrates example operations that may be performed to cancel self-interference in a MIMO system, in accordance with an embodiment of the present disclosure. At 1502, the MIMO system transmits a first transmit signal from a first transmit path using a first antenna. At 1504, the MIMO system transmits a second transmit signal from a second transmit path using a second antenna. At 1506, the MIMO system receives a first receive signal from a first receive path using the first antenna. At 1508, the MIMO system dynamically varies a value applied to each of a multitude of variable elements disposed in the MIMO system in accordance with a frequency response characteristics of the variable elements thereby to remove, from the first receive signal, a portion of an interference signal corresponding to a self-interference associated with the first transmit signal and across-talk interference associated with the second transmit signal.

Figure 16:
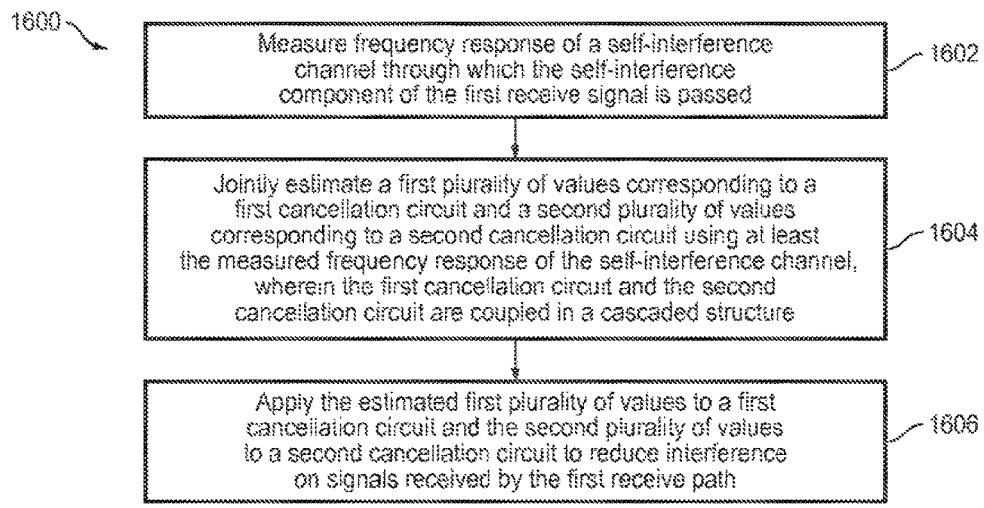
FIG. 16 illustrates example operations that may be performed by a device to tune a cascaded MIMO cancellation circuit, in accordance with an embodiment of the present disclosure.

FIG. 16 illustrates example operations that may be performed by a device to tune a cascaded MIMO cancellation circuit, in accordance with an embodiment of the present disclosure. At 1602, the device measures frequency response of a self-interference channel through which the self-interference component of the first receive signal is passed. At 1604, the device jointly estimates a first multitude of values corresponding to a first cancellation circuit and a second multitude of values corresponding to a second cancellation circuit using at least the measured frequency response of the self-interference channel. As an example, the device determines a multitude of values for variable attenuators in the first and the second cancellation circuits. The first cancellation circuit and the second cancellation circuit are coupled in a cascaded structure. At 1606, the device applies the estimated first multitude of values to a first cancellation circuit and the second multitude of values to a second cancellation circuit to reduce interference on signals received by the first receive path.

In one embodiment, the above tuning algorithm may be performed per receive chain to jointly tune the cascaded cancellation architectures associated with that receive chain. For example, a first controller may tune/adjust the variable parameters in cascaded filter structures used in the first cancellation circuit corresponding to a first receive chain. In addition, a second controller may tune/adjust the variable parameters in cascaded filter structures used in the second cancellation circuit corresponding to the second receive chain.

Figure 17:
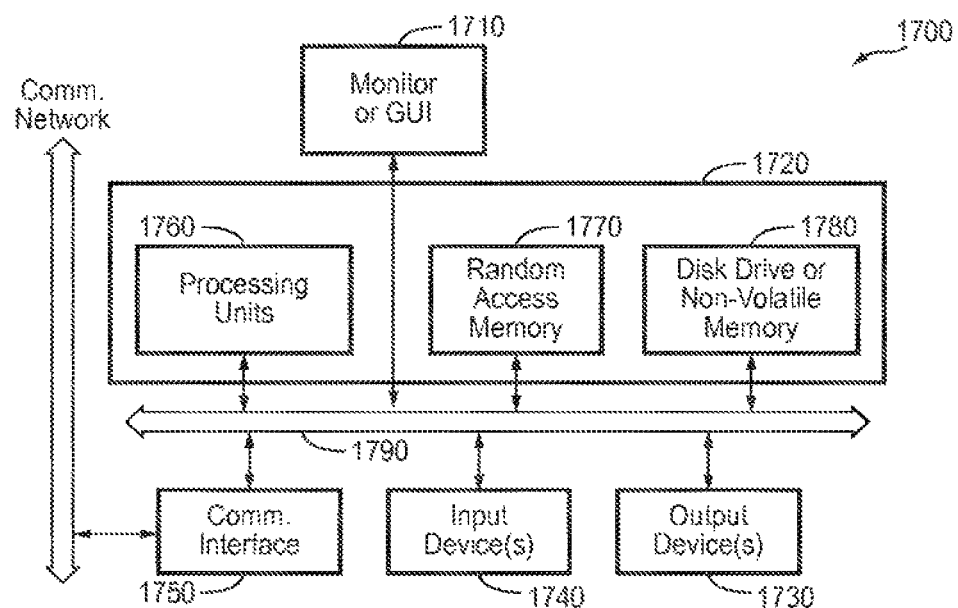
FIG. 17 is a simplified block diagram of an exemplary computer or data processing system in which portions of analog self-interference cancellation circuit, as well as the digital self-interference cancellation circuit may be disposed, in accordance with an embodiment of the present disclosure.

FIG. 17 is a simplified block diagram of an exemplary computer or data processing system 1700 in which portions of analog self-interference cancellation circuit, such as controller 20 shown in FIG. 1 or controller 280 shown in FIG. 4, as well as the digital self-interference cancellation circuit, such digital cancellation circuit 18 of FIG. 1 or digital cancellation circuit 160 of FIG. 3, may be embodied. Computer system 1700 is shown as including a monitor 1710, a computer 1720, user output devices 1730, user input devices 1740, communications interface 1750, and the like.

As shown in FIG. 17, computer 1720 may include one or more processors or processing units 1760 that communicates with a number of peripheral devices via a bus subsystem 1790. These peripheral devices may include user output devices 1730, user input devices 1740, communications interface 1750, and a storage subsystem, such as random access memory (RAM) 1770 and non-volatile memory 1780.

User input devices 1730 include all possible types of devices and mechanisms for inputting information to computer system 1720. These may include a keyboard, a keypad, a touch screen incorporated into the display, audio input devices such as voice recognition systems, microphones, and other types of input devices. User input devices 1730 typically allow a user to select objects, icons, text and the like that appear on the monitor 1710 via a command such as a click of a button or the like. User output devices 1740 include all possible types of devices and mechanisms for outputting information from computer 1720. These may include a display (e.g., monitor 1710), non-visual displays such as audio output devices, etc.

Communications interface 1750 provides an interface to other communication networks and devices. Communications interface 1750 may serve as an interface for receiving data from and transmitting data to other systems. In various embodiments, computer system 1700 may also include software that enables communications over a network.

RAM 1770 and disk drive 1780 are examples of tangible media configured to store data including, for example, executable computer code, human readable code, or the like. Other types of tangible media include floppy disks, removable hard disks, semiconductor memories such as flash memories, non-transitory read-only-memories (ROMS), battery-backed volatile memories, and the like. RAM 1770 and non-volatile memory 1780 may be configured to store the basic programming and data constructs that provide the functionality described above in accordance with embodiments of the present invention. Software code modules and instructions that provide such functionality may be stored in RAM 1770 and/or non-volatile memory 1780. These software modules may be executed by processor(s) 1760. RAM 1770 and non-volatile memory 1780 may also provide a repository for storing data used in accordance with embodiments of the present invention.

RAM 1770 and non-volatile memory 1780 may include a number of memories including a main random access memory (RAM) for storage of instructions and data during program execution and a read only memory (ROM) in which fixed non-transitory instructions are stored. RAM 1770 and non-volatile memory 1780 may include a file storage subsystem providing persistent (non-volatile) storage for program and data files. RAM 1770 and non-volatile memory 1780 may also include removable storage systems, such as removable flash memory.

Bus subsystem 1790 provides a mechanism for enabling the various components and subsystems of computer 1720 communicate with each other as intended. Although bus subsystem 1790 is shown schematically as a single bus, alternative embodiments of the bus subsystem may utilize multiple busses.

Various embodiments of the present invention may be implemented in the form of logic in software or hardware or a combination of both. The logic may be stored in a computer readable or machine-readable non-transitory storage medium as a set of instructions adapted to direct a processor of a computer system to perform the functions described above in accordance with embodiments of the present invention. Such logic may form part of a computer adapted to direct an information-processing device to perform the functions described above.

The data structures and code described herein may be partially or fully stored on a computer-readable storage medium and/or a hardware module and/or hardware apparatus. A computer-readable storage medium includes, but is not limited to, volatile memory, non-volatile memory, magnetic and optical storage devices or other media, now known or later developed, that are capable of storing code and/or data. Various circuit blocks of the embodiments of the present invention described above may be disposed in an application-specific integrated circuits (ASICs), field-programmable gate arrays (FPGAs), dedicated or shared processors, and/or other hardware modules or apparatuses now known or later developed.

The methods and processes described herein may be partially or fully embodied as code and/or data stored in a computer-readable storage medium or device, so that when a computer system reads and executes the code and/or data, the computer system performs the associated methods and processes. The methods and processes may also be partially or fully embodied in hardware modules or apparatuses, so that when the hardware modules or apparatuses are activated, they perform the associated methods and processes. The methods and processes disclosed herein may be embodied using a combination of code, data, and hardware modules or apparatuses.

The above descriptions of embodiments of the present invention are illustrative and not limitative. For example, the various embodiments of the present inventions are not limited to the use of preamble symbols, which may be WiFi preambles, LTE preambles or otherwise. Other modifications and variations will be apparent to those skilled in the art and are intended to fall within the scope of the appended claims.

What is claimed is:

1. A wireless communication system comprising:
   first transmit path adapted to transmit first transmit signal from a first antenna;
   a second transmit path adapted to transmit a second transmit signal from a second antenna;
   a first receive path adapted to receive a first receive signal;
   a second receive path adapted to receive a second receive signal;
   a first interference cancellation circuit coupled to the first and the second transmit paths and adapted to remove a first portion of an interference signal from the first receive signal corresponding to the first transmit signal and a second portion of the interference signal from the first receive signal corresponding to the second transmit signal, the first interference cancellation circuit comprising a plurality of filter taps each including a variable element;
   a second interference cancellation circuit coupled to the first and the second transmit paths and adapted to remove a first portion of an interference signal corresponding to the first transmit signal from the second receive signal and a second portion of the interference signal corresponding to the second transmit signal from the second receive signal, the second interference cancellation circuit comprising a second plurality of filter taps each including a variable element; and
   a controller adapted to dynamically vary a value applied to each of the plurality of variable elements in accordance with frequency response characteristics of the variable element; wherein the controller is further adapted to dynamically vary a value applied to each of the plurality of variable elements in the second plurality of filter taps in accordance with frequency response characteristics of the variable element.

2. The wireless communication system of claim 1, wherein the first receive signal is received by the first antenna, said first portion of the interference signal corresponds to self-interference and said second portion of the interference signal corresponds to cross-talk interference from transmission from the second antenna.

3. The wireless communication system of claim 1, wherein the first interference cancellation circuit comprises a cascaded filter structure comprising a first filter having N parallel filter taps and a second filter having C parallel filter taps, N and C being integer values greater than one.

4. The wireless communication system of claim 3, wherein the controller is further adapted to jointly determine a first plurality of N values corresponding to the variable elements in the first filter and a second plurality of C values corresponding to the variable elements in the second filter.

5. The wireless communication system of claim 3, wherein the first transmit signal is coupled to the first filter, and the second transmit signal is coupled to a cascade of the first and the second filters.

6. The wireless communication system of claim 1, wherein the cancellation circuit further comprises: a digital interference cancellation circuit coupled to the first and the second transmit paths and adapted to dynamically remove a third portion of an interference signal from the first receive signal corresponding to the first transmit signal and a fourth portion of the interference signal from the receive signal corresponding to the second transmit signal, the digital cancellation circuit utilizing a plurality of samples of the first and the second transmit signals.

7. The wireless communication system of claim 6, wherein the digital interference cancellation circuit comprises a cascaded filter structure comprising a first filter structure coupled to the first transmit path, a second filter structure coupled to the second transmit path, and a shared filter structure coupled to the first and the second filter structures.

8. The wireless communication system of claim 6, wherein said digital interference cancellation circuit is disposed in the controller.

9. The wireless communication system of claim 1, wherein said wireless communication system is further adapted to measure a frequency response characteristic of a plurality of channels through which the first transmit signal and the second transmit signals are transmitted using a plurality of preamble symbols, said plurality of preamble symbols being jointly transmitted from each of the first and the second antennas, said controller being further adapted to dynamically adjust each of the plurality of variable elements in accordance with the frequency response characteristics of the plurality of channels.

10. The wireless communication system of claim 1, wherein the first transmit signal comprises a first preamble portion comprising a first preamble symbol transmitted in two subsequent time slots, and the second transmit signal comprises a second preamble portion comprising a phase shifted copy of the second preamble symbol and the second preamble symbol being transmitted in two subsequent time slots.

11. The wireless communication system of claim 1, wherein the variable element is a variable attenuator and one or more of the filter taps further comprise a delay element.

12. The wireless communication system of claim 11, further comprising: a memory adapted to store at least one frequency response characteristic associated with at least one attenuation value of each of the plurality of variable attenuators.

13. The wireless communication system of claim 12, wherein said controller is adapted to generate a plurality of attenuation values for each of the plurality of variable attenuators in accordance with an S parameter associated with the variable attenuator.

14. The wireless communication system of claim 1, wherein said controller is a processor or a computer.

15. The wireless communication system of claim 1, wherein said wireless communication system is a full-duplex wireless communication system.

16. A method of operating a wireless communication system, the method comprising:
transmitting a first transmit signal from a first transmit path using a first antenna;
transmitting a second transmit signal from a second transmit path using a second antenna;
receiving a first receive signal at a first receive path using the first antenna, the first receive signal comprising a self-interference component corresponding to the first transmit signal, and a cross-talk interference component corresponding to the second transmit signal;
dynamically varying a value applied to each of a plurality of variable elements disposed in the wireless communication system in accordance with frequency response characteristics of the variable elements to remove, from the first receive signal, the self-interference component and the cross-talk interference component; wherein the variable elements are variable attenuators;
storing in a memory at least one frequency response characteristic associated with at least one attenuation value of each of the plurality of the variable attenuators; and
generating a plurality of attenuation values for the plurality of variable attenuators in accordance with an S parameter associated with the variable attenuators.

17. The method of claim 16, wherein the first transmit signal comprises two consequent copies of a first preamble symbol and the second transmit signal comprises a phase shifted copy of the second preamble symbol followed by the second preamble symbol.

18. The method of claim 16, wherein dynamically varying a value applied to each of a plurality of variable elements comprises: measuring frequency response of a self-interference channel through which the self-interference component of the first receive signal is passed; jointly estimating a first plurality of values corresponding to a first cancellation circuit and a second plurality of values corresponding to a second cancellation circuit using at least the measured frequency response of the self-interference channel, wherein the first cancellation circuit and the second cancellation circuit are coupled in a cascaded structure; and applying the estimated first plurality of values to a first cancellation circuit and the second plurality of values to a second cancellation circuit to reduce interference on signals received by the first receive path.

19. The method of claim 16, wherein dynamically varying a value applied to each of a plurality of variable elements comprises: measuring frequency response characteristics of a first channel through which the first transmit signal is transmitted and frequency response characteristics of a second channel through which the second transmit signal is transmitted using at least two jointly transmitted pre amble symbols; calculating a first set of values, each corresponding to one of the plurality of variable elements in accordance with the frequency response characteristics of the first and the second channels; and applying the calculated first set of values to the variable elements; iteratively measuring frequency response characteristics of the first and the second channels after the first set of values are applied to the variable elements, and updating the first set of values based on the new frequency response measurements.

20. The method of claim 16 further comprising: removing a second portion of the self-interference signal front the receive signal using a digital interference cancellation circuit.

21. The method of claim 20 further comprising wherein said digital interference cancellation circuit is disposed in a processor configured to execute instructions.

22. The method of claim 16 wherein said wireless communication system is a full-duplex wireless communication system.

23. A wireless communication system comprising:
first transmit path adapted to transmit first transmit signal from a first antenna;
a second transmit path adapted to transmit a second transmit signal from a second antenna;
a first receive path adapted to receive a first receive signal;
a first interference cancellation circuit coupled to the first and the second transmit paths and adapted to remove a first portion of an interference signal from the first receive signal corresponding to the first transmit signal and a second portion of the interference signal from the first receive signal corresponding to the second transmit signal, the first interference cancellation circuit comprising a plurality of filter taps each including a variable element; wherein the first interference cancellation circuit comprises a cascaded filter structure comprising a first filter having N parallel filter taps and a second filter having C parallel filter taps, N and C being integer values greater than one; and
a controller adapted to dynamically vary a value applied to each of the plurality of variable elements in accordance with frequency response characteristics of the variable element; wherein the controller is further adapted to jointly determine a first plurality of N values corresponding to the variable elements in the first filter and a second plurality of C values corresponding to the variable elements in the second filter.

* * * * *